(12) United States Patent
Schumacher et al.

(10) Patent No.: US 11,964,542 B2
(45) Date of Patent: Apr. 23, 2024

(54) METHODS AND SYSTEMS FOR CAMERA VISION APPLICATIONS FOR PERISHABLE GOODS TRANSPORTATION VISUAL AIDS TO IMPROVE PERFORMANCE

(71) Applicant: THERMO KING LLC, Minneapolis, MN (US)

(72) Inventors: Ryan Wayne Schumacher, Bloomington, MN (US); Matthew Srnec, Minnetonka, MN (US)

(73) Assignee: THEMRO KING LLC, Minneapolis, MN (US)

( * ) Notice: Subject to any disclaimer, the term of this patent is extended or adjusted under 35 U.S.C. 154(b) by 356 days.

(21) Appl. No.: 17/452,914

(22) Filed: Oct. 29, 2021

(65) Prior Publication Data

US 2023/0139951 A1    May 4, 2023

(51) Int. Cl.
   *G06V 20/59*       (2022.01)
   *B60H 1/32*        (2006.01)

(52) U.S. Cl.
   CPC ......... *B60H 1/3205* (2013.01); *B60H 1/3232* (2013.01); *G06V 20/59* (2022.01)

(58) Field of Classification Search
   CPC ..... B60H 1/3205; B60H 1/3232; G06V 20/59
   See application file for complete search history.

(56) References Cited

U.S. PATENT DOCUMENTS

| | | | |
|---|---|---|---|
| 8,682,751 B1 | 3/2014 | Antony | |
| 9,470,797 B2 | 10/2016 | Walgren et al. | |
| 9,607,282 B2 | 3/2017 | Brosius, III | |
| 10,678,611 B2 | 6/2020 | Grundy et al. | |
| 11,004,236 B2 | 5/2021 | Mustafi et al. | |
| 2007/0157640 A1 | 7/2007 | Bolger et al. | |
| 2019/0281867 A1 | 9/2019 | Beasley et al. | |
| 2021/0150273 A1 | 5/2021 | Mustafi et al. | |

FOREIGN PATENT DOCUMENTS

WO    2020/142061    7/2020

OTHER PUBLICATIONS

Extended European Search Report, issued in the corresponding European patent application No. 22204565.0, dated Mar. 27, 2023, 8 pages.

(Continued)

*Primary Examiner* — Mathew Franklin Gordon
(74) *Attorney, Agent, or Firm* — HSML P.C.

(57) ABSTRACT

A transport climate control system includes a vision system having an image capturing device to capture an image. An image recognition system is configured to analyze the captured image to obtain analyzed image data, and determine an instruction for adjusting operation of the transport climate control system or the transport unit. A controller is configured to execute the determined instruction. A method of controlling a transport climate control system that provides climate control within a climate controlled space of a transport unit that includes an image capturing device capturing an image within a climate controlled space is provided. The method includes analyzing the captured image by an image recognition system communicatively connected with the image capturing device; determining an instruction; and a controller executing the determined instruction.

15 Claims, 12 Drawing Sheets

(56) References Cited

OTHER PUBLICATIONS

Álvarez-Bermejo et al., "Image processing methods to evaluate tomato and zucchini damage in postharvest stages", International Journal of Agricultural and Biological Engineering, Jan. 2017, 9 pages.

Komatsu et al., "Image Recognition Technology that Helps Save Energy in Room Air Conditioners", Hitachi Review, vol. 64, No. 8, 2015, 6 pages.

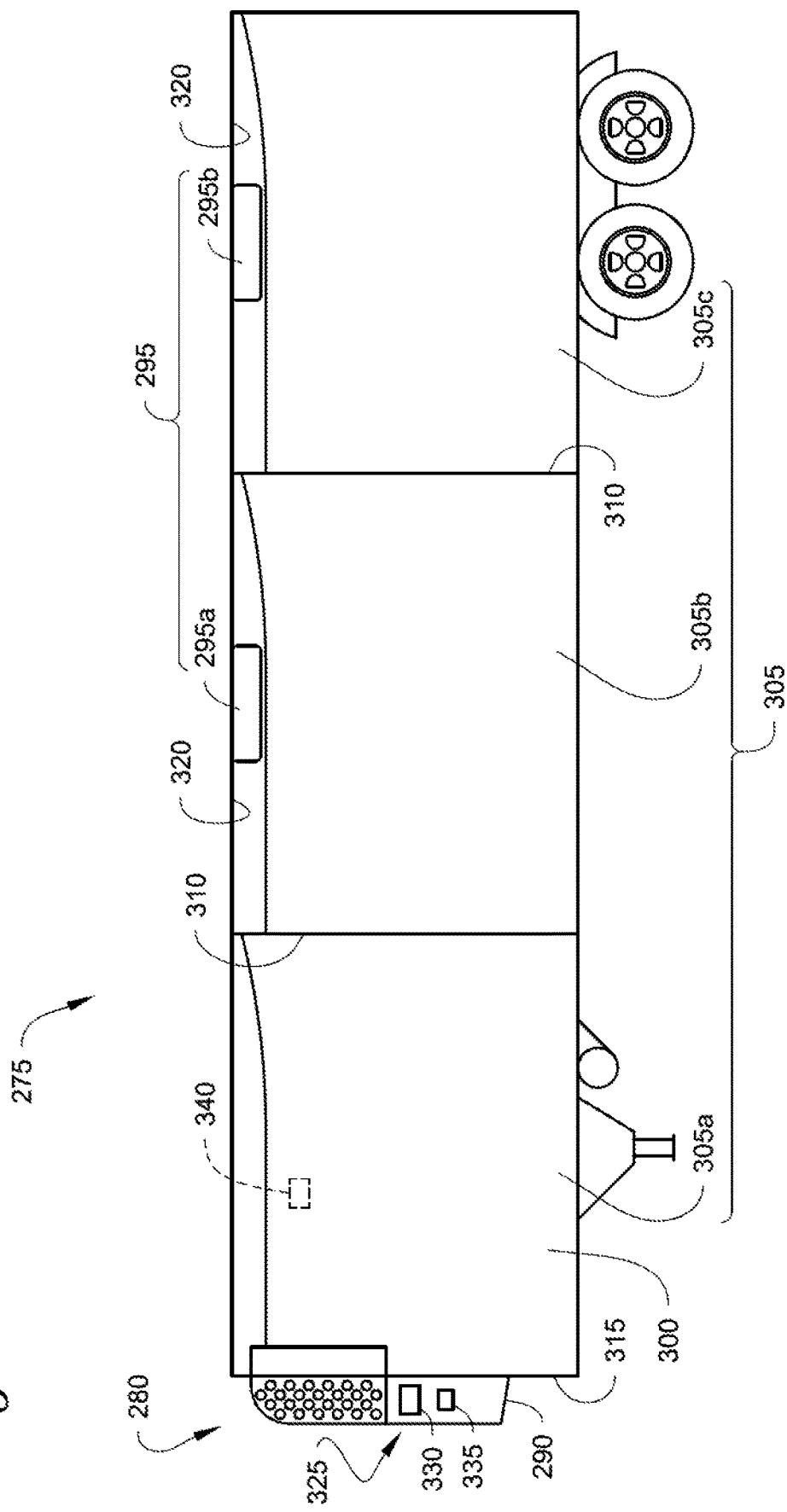

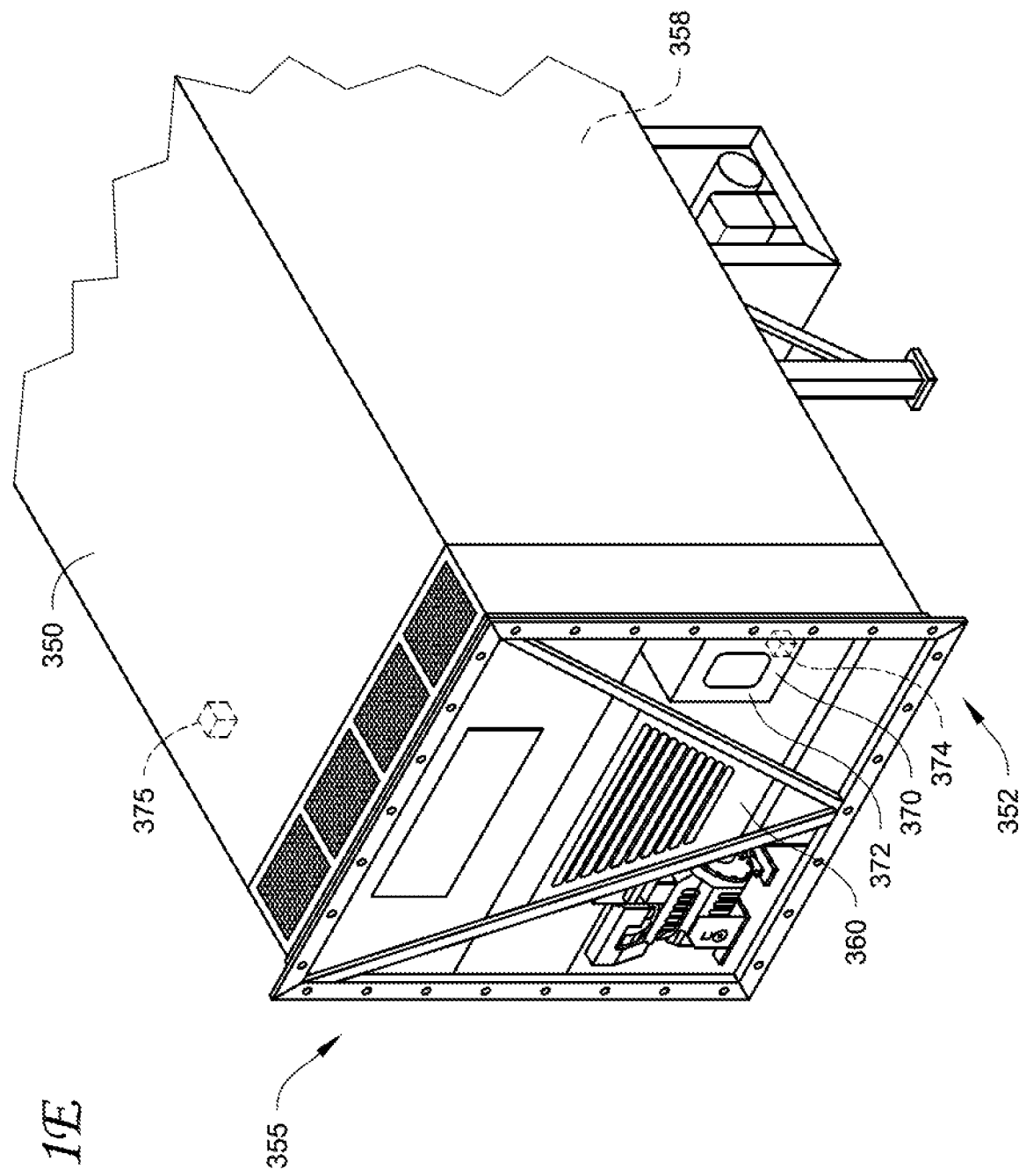

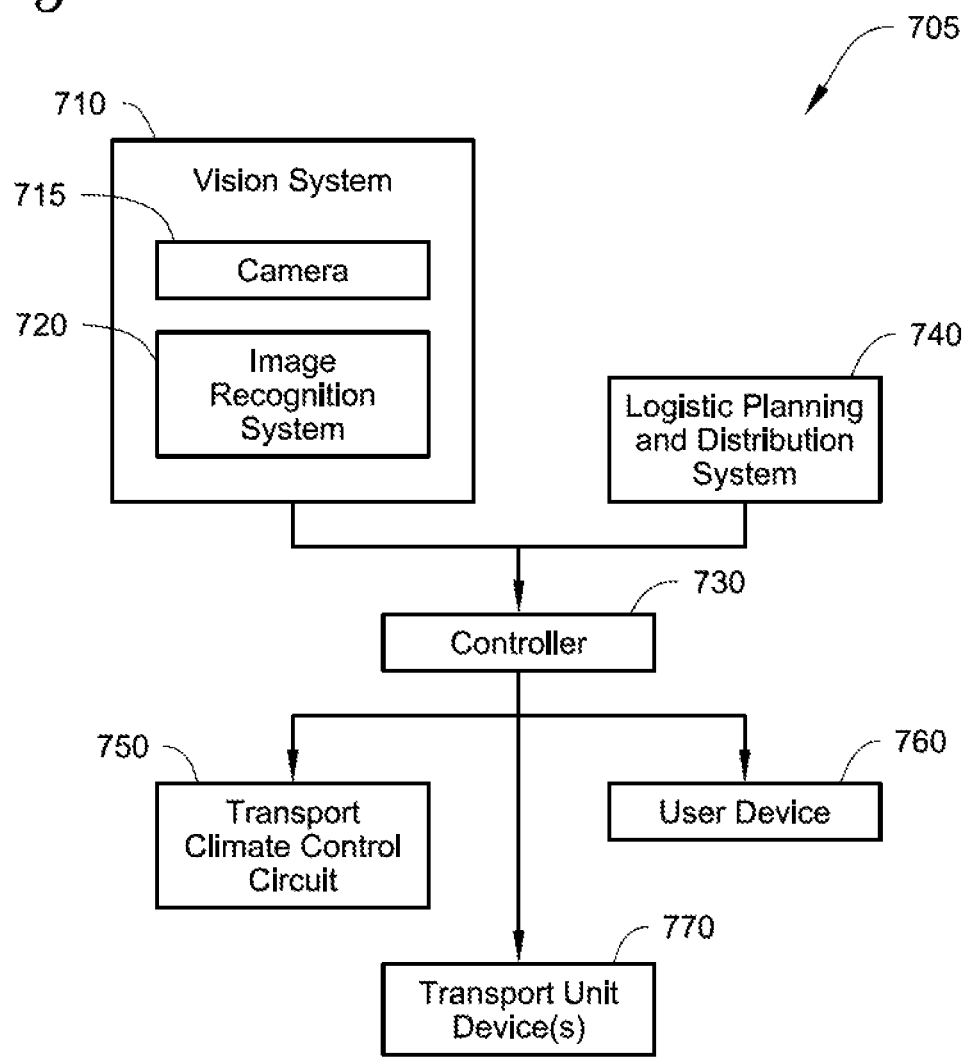

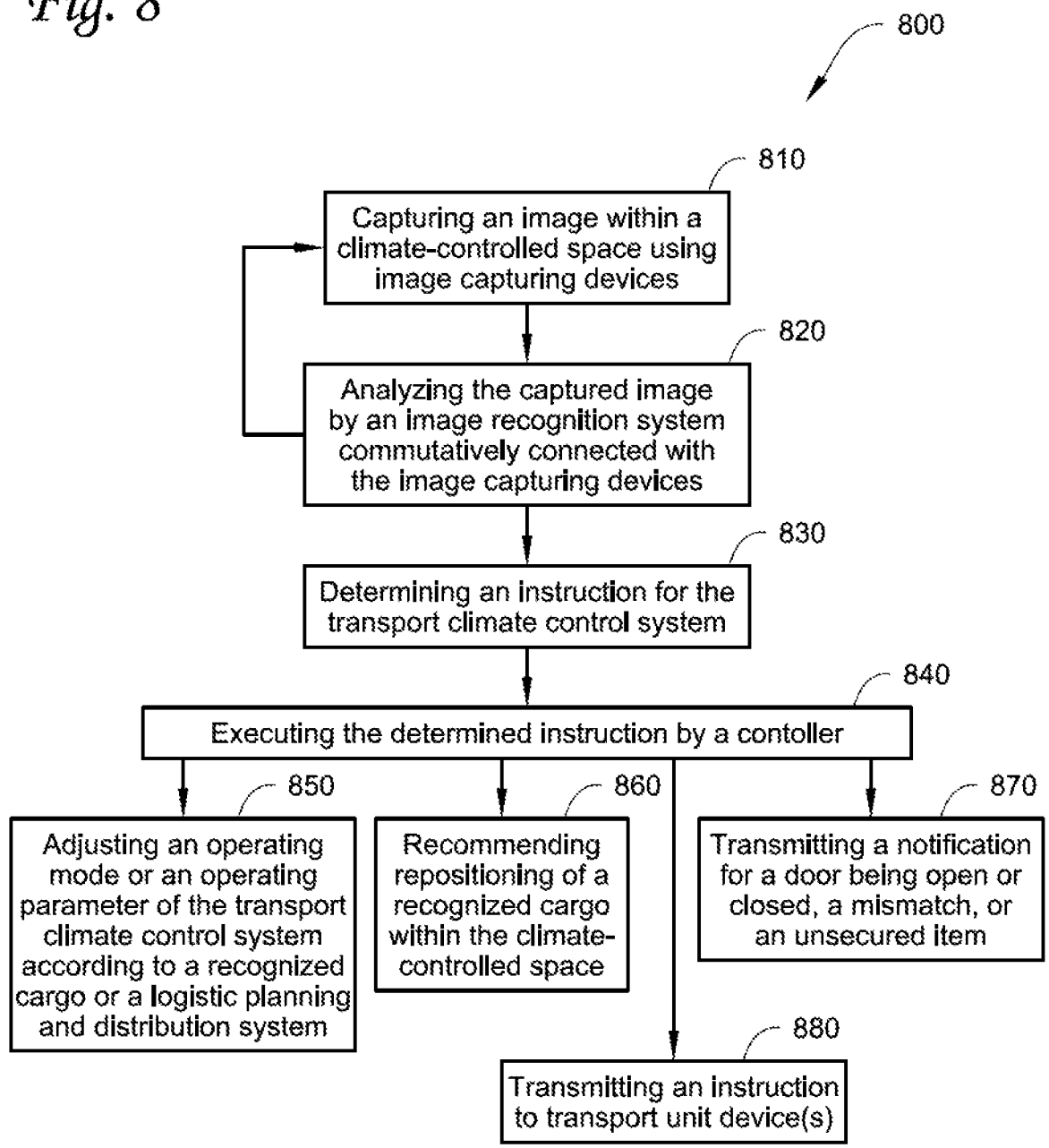

METHODS AND SYSTEMS FOR CAMERA VISION APPLICATIONS FOR PERISHABLE GOODS TRANSPORTATION VISUAL AIDS TO IMPROVE PERFORMANCE

FIELD

This disclosure relates generally to improving control of a transport climate control system. More specifically, this disclosure relates to methods and systems for controlling a transport climate control system for a transport unit using an image captured by a vision system.

BACKGROUND

A transport climate control system is generally used to control one or more environmental conditions such as, but not limited to, temperature, humidity, air quality, or combinations thereof, of a transport unit. Examples of transport units include, but are not limited to a truck, a container (such as a container on a flat car, an intermodal container, a marine container, etc.), a box car, a semi-tractor, or other similar transport unit. A transport unit with a transport climate control system is commonly used to transport perishable cargos such as produce, frozen foods, meat products, pharmaceuticals, and vaccines.

SUMMARY

This disclosure relates generally to improving control of a transport climate control system. More specifically, this disclosure relates to methods and systems for controlling a transport climate control system for a transport unit using an image captured by a vision system.

By capturing one or more images within a transport unit, the vision system can recognize a cargo from the captured images and determine the cargo being loaded and unloaded into the transport unit. A transport climate control system can adjust an operating parameter, forecast energy consumption of the transport unit, or transmit a notification according to the cargo recognized by the vision system. By continuously capturing images within the transport unit, the vision system can detect and record cargo or other items being loaded and unloaded from the transport system over time for providing record keeping, such as loading sequences, loading and un-loading time stamps, in-transit duration of time sensitive product for regulatory or product quality (e.g., pharmaceutical products), visual records for determining thief or damage, and the like.

Also, the one or more images captured by the vision system can be used to determine a door opening or closing event of the transport unit. By monitoring door opening and closing events with the vision system can eliminate or backup a mechanical door sensor. Mechanical door sensors can have magnetic or mechanical moving part that become less sensitive or faulty during transportation and/or at extreme temperature. Details of a virtual door sensor are described in U.S. application Ser. No. 17/452,915 titled "VIRTUAL DOOR SENSOR FOR TRANSPORT UNIT," (having named inventors Girija Parthasarathy and Stephanie Benson, which is incorporated by reference in its entirety.

According to some embodiments, a transport climate control system for providing climate control within a climate controlled space of a transport unit is provided. The system includes a vision system having an image capturing device configured to capture an image within the climate controlled space, and an image recognition system communicatively connected with the image capturing device. The system is configured to analyze the captured image to obtain analyzed image data, and determine an instruction based on the analyzed image data for adjusting operation of the transport climate control system or the transport unit; the transport climate control system configured to provide climate control within the climate controlled space; and a controller configured to execute the determined instruction to adjust operation of the transport climate control system or the transport unit.

According to some embodiments of the transport climate control system, the image recognition system is configured to recognize a door being opened or unlatched by detecting a visual aid that provides an amplified visual indicator.

According to some embodiments of the transport climate control system, the determined instruction includes an adjustment instruction to adjust an operating mode or an operating parameter of the transport climate control system according to a cargo recognized from the analyzed image data or a logistic planning and distribution system, According to some embodiments of the transport climate control system, the determined instruction includes a recommendation instruction to recommend repositioning of a cargo recognized from the analyzed image data within the climate controlled space.

According to some embodiments of the transport climate control system, the determined instruction includes a notification instruction to transmit a notification for a door being opened or closed, a mismatch, or an unsecured item.

According to some embodiments of the transport climate control system, the mismatch includes the cargo recognized from the captured image being loaded or unload to a wrong zone of the climate controlled space or at a wrong location. The wrong zone is determined by comparing the cargo against a bill of lading, and the wrong location is determined by a location information provided by a telematics system and a correct loading or unloading location provided by the logistic planning and distribution system communicatively connect to the transport climate control system.

According to some embodiments of the transport climate control system, the determined instruction includes a transport unit instruction to operate a transport unit device.

According to some embodiments, a method of controlling a transport unit with a transport climate control system that provides climate control within a climate controlled space of the transport unit is provided. The method includes an image capturing device capturing an image within a climate controlled space; analyzing the captured image by an image recognition system communicatively connected with the image capturing device to obtain analyzed image data; determining an instruction based on the analyzed image data for adjusting operation of the transport climate control system or the transport unit; and a controller executing the determined instruction to adjust operation of the transport climate control system or the transport unit.

According to some embodiments of the method, analyzing the captured image includes recognizing a door being opened or unlatched by detecting a visual aid that provides an amplified visual indicator.

According to some embodiments, the method includes adjusting an operating mode or an operating parameter of the transport climate control system according to a cargo recognized from the analyzed image data or a logistic planning and distribution system.

According to some embodiments, the method includes recommending repositioning of a cargo recognized from the analyzed image data within the climate controlled space.

According to some embodiments, the method includes transmitting a notification for a door being opened or closed, a mismatch, or the unsecured item.

According to some embodiments of the method, analyzing the captured image includes recognizing a visual aid in the captured image.

According to some embodiments of the method, the mismatch includes the cargo recognized from the captured image being loaded or unload to a wrong zone of the climate controlled space or at a wrong location. The wrong zone is determined by comparing the cargo against a bill of lading, and the wrong location is determined by a location information provided by a telematics system and a correct loading or unloading location provided by the logistic planning and distribution system communicatively connect to the transport climate control system.

According to some embodiments of the method, the unsecured item is determined by the lack of a recognized securement in the captured image.

In another embodiment, a load quality can be determined or obtained with a vision system. A load quality of a cargo can be one or more factors that determine energy consumption of the transport climate control system due to the cargo being loaded or unloaded from the climate controlled space. For example, a quality can include the size, weight, temperature, heat capacity, environmental conditions required, and the like. The vision system can determine one or more of the qualities directly using its image recognition system or indirectly from a database indexed to a detected cargo or visual aid. A vision system including a thermal camera can determine the temperature, heat capacities, energy consumptions, and other related load qualities. The climate control system can extrapolate the energy consumption when the load quality is unknown by perturbing the climate control system and monitoring the response with environmental condition sensor(s), the thermal camera, and the like. Alternatively, the load quality can be estimated using pull-down data or other predetermined estimating models to predict the energy consumption due to a particular cargo. The transport climate control system can aggregate the load quality determined from image data captured by camera and other energy consumption forecasts obtained for other methods to generate an overall energy consumption forecast for the climate control system. The vision system can further determine available space within the climate controlled space, for example, by detecting the size of the loaded cargo. The vision system can determine a loaded cargo blocking an air vent by predetermining an area within a view of a camera being blocking the air vent and detecting a cargo is placed in the predetermined area. The vision system can instruct repositioning cargo based on the determined load quality. For example, the vision system can determine a cargo that needs additional cooling using the thermal camera and acquired environmental condition requirements for storing the cargo. An instruction can be transmitted to an operator based on determination and suggest moving the cargo to a location in the climate controlled space with stronger cooling capacity, for example, at the air vent. The vision system can determine uneven conditioning using, for example, the image data captured by a thermal camera within the climate controlled space and redirect a damper on an air vent. The damper can be driven by a motor controlled by a control signal generated according to the instruction.

BRIEF DESCRIPTION OF THE DRAWINGS

References are made to the accompanying drawings that form a part of this disclosure, and which illustrate embodiments in which the systems and methods described in this Specification can be practiced.

FIG. 1D is a side view of a trailer with a transport climate control system including a multi-zone transport climate control system, according to an embodiment.

FIG. 1E is a perspective view of a climate controlled transport unit, according to an embodiment.

FIG. 7 is a schematic diagram of a transport climate control system, according to an embodiment.

FIG. 8 is a flow chart of a method for operating a transport climate control system operation, according to an embodiment.

Like reference numbers represent like parts throughout.

DETAILED DESCRIPTION

This disclosure relates generally to improving control of a transport climate control system. More specifically, this disclosure relates to methods and systems for controlling a transport climate control system using an image captured by a vision system.

A transport unit can include, for example, a truck, a van, a container (such as a container on a flat car, an intermodal container, a marine container, etc.), a box car, a semi-tractor, or other similar transport unit. Embodiments of this disclosure may be used in any suitable environmentally controlled transport unit.

A climate controlled transport unit (e.g., a transport unit including a transport climate control system) can be used to transport perishable items such as, but not limited to, pharmaceuticals, biological samples, produce, frozen foods, and meat products.

Figure 1A:
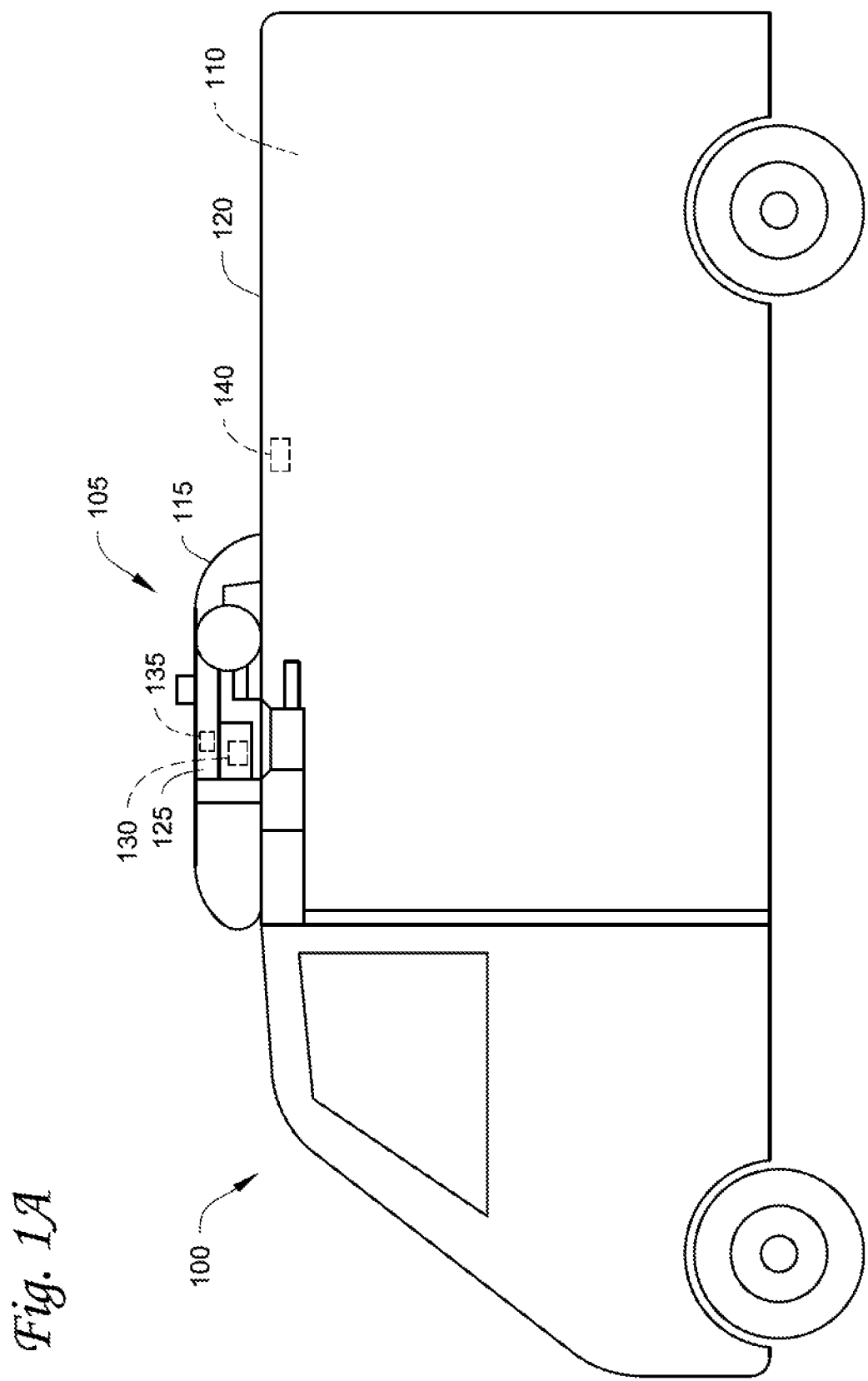
FIG. 1A is a side view of a van with a transport climate control system, according to an embodiment.
Figure 1B:
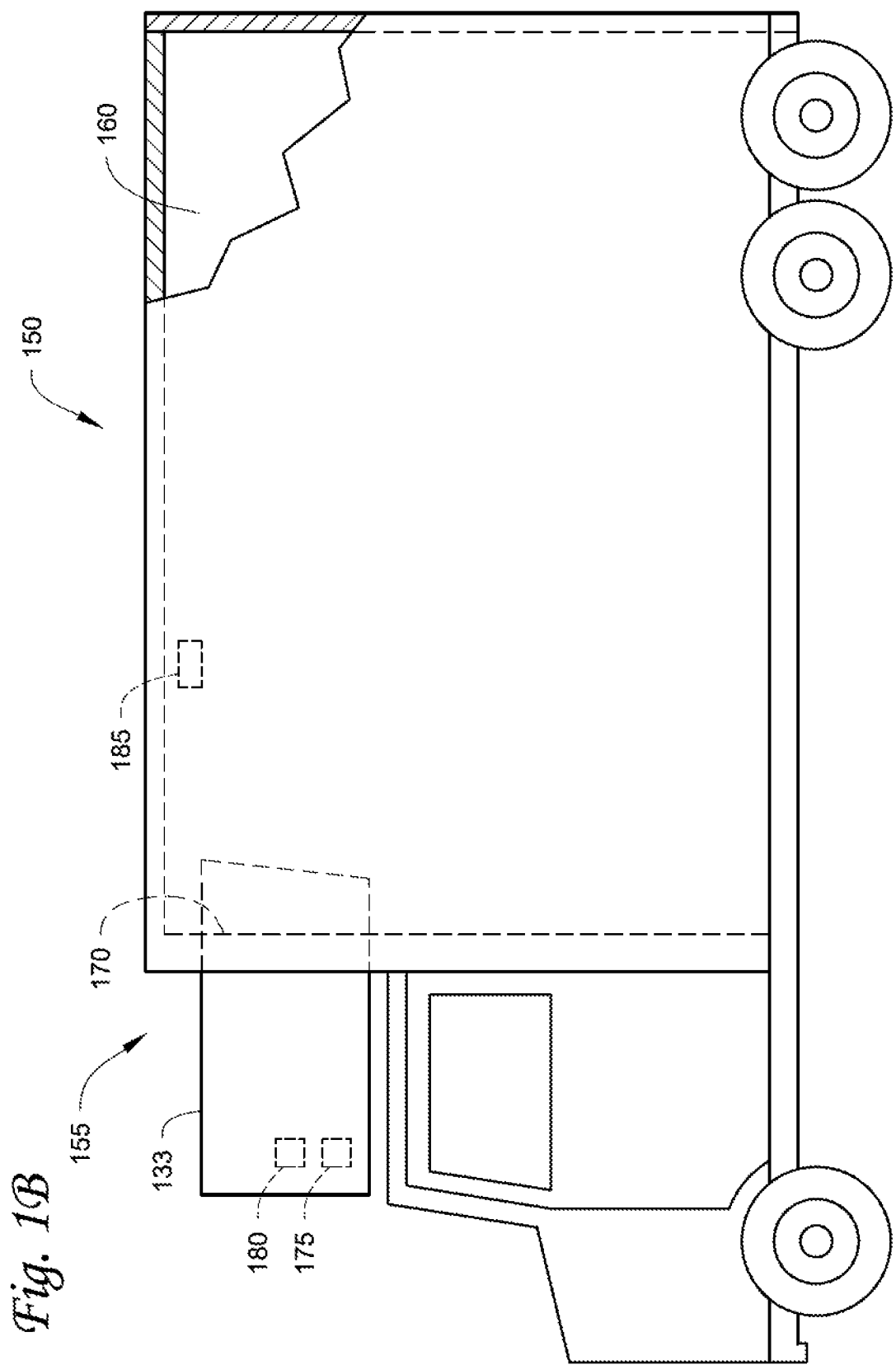
FIG. 1B is a side view of a truck with a transport climate control system, according to an embodiment.
Figure 1C:
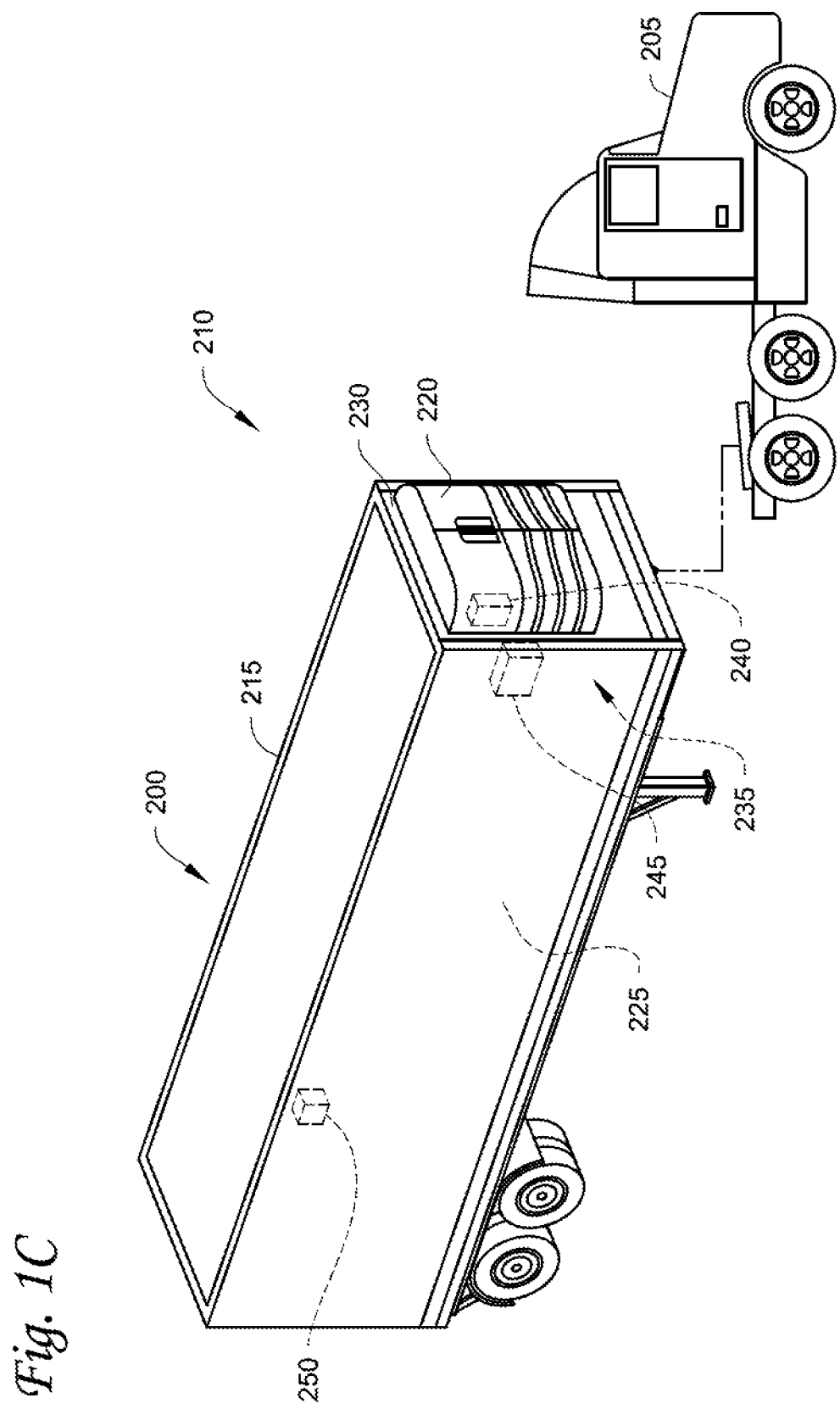
FIG. 1C is a perspective view of a trailer with a transport climate control system, according to an embodiment.

FIGS. 1A-1E show various embodiments of a transport climate control system. FIG. 1A is a side view of a van 100 with a transport climate control system 105, according to an embodiment. FIG. 1B is a side view of a truck 150 with a transport climate control system 155, according to an embodiment. FIG. 1C is a perspective view of a climate controlled transport unit 200 attachable to a tractor 205, according to an embodiment. The climate controlled transport unit 200 includes a transport climate control system 210. FIG. 1D is a side view of a climate controlled transport unit 275 including a multi-zone transport climate control system 280, according to an embodiment. FIG. 1E is a perspective view of an intermodal container 350 with a transport climate control system 355.

FIG. 1A depicts the van 100 having the transport climate control system 105 for providing climate control within a climate controlled space 110. The transport climate control system 105 includes a climate control unit (CCU) 115 that is mounted to a rooftop 120 of the van 100. In an embodiment, the CCU 115 can be a transport refrigeration unit.

The transport climate control system 105 can include a climate control circuit that connects, for example, a compressor, a condenser, an evaporator, and an expander (e.g., an expansion valve or other expansion devices) to provide climate control within the climate controlled space 110. As defined herein, an expander can be an expansion valve or any other type of expander that is configured to control an amount of working fluid passing there through and thereby regulate the superheat of vapor leaving an evaporator. The expander may or may not be configured to generate power. In some embodiments, the climate control circuit can be a single stage climate control circuit or a cascade climate control circuit.

It will be appreciated that the embodiments described herein are not limited to vans or climate controlled vans, but can apply to any type of transport unit (e.g., a truck, a container (such as a container on a flat car, an intermodal container, a marine container, etc.), a box car, a semi-tractor, or other similar transport unit), within the scope of the principles of this disclosure.

The transport climate control system 105 also includes a programmable climate controller 125 and one or more climate control sensors that are configured to measure one or more parameters of the transport climate control system 105 (e.g., an ambient temperature outside of the van 100, an ambient humidity outside of the van 100, a compressor suction pressure, a compressor discharge pressure, a supply air temperature of air supplied by the CCU 115 into the climate controlled space 110, a return air temperature of air returned from the climate controlled space 110 back to the CCU 115, a humidity within the climate controlled space 110, etc.) and communicate the measured parameters to the climate controller 125. The one or more climate control sensors can be positioned at various locations outside the van 100 and/or inside the van 100 (including within the climate controlled space 110).

The climate controller 125 is configured to control operation of the transport climate control system 105. The climate controller 125 may include a single integrated control unit 130 or may include a distributed network of climate controller elements 130, 135. The number of distributed control elements in a given network can depend upon the particular application of the principles of this disclosure. The measured parameters obtained by the one or more climate control sensors can be used by the climate controller 125 to control operation of the transport climate control system 105.

The van 100 includes a sensor 140. In the illustrated embodiment, the sensor 140 is represented as a single sensor. It will be appreciated that in other embodiments, the van 100 can include a plurality of sensors 140. In some embodiments, the sensor 140 can monitor one or more climate control parameters (e.g., temperature, humidity, atmosphere, etc.) within the climate controlled space 110 or just outside the van 100. The sensor 140 can be used by the climate controller 125 to control operation of the transport climate control system 105. The sensor 140 can be in electronic communication with a power source (not shown) of the CCU 115. In an embodiment, the sensor 140 can be in electronic communication with the climate controller 125. It will be appreciated that the electronic communication between the sensor 140 and the climate controller 125 can enable network communication of the sensed climate control parameters measured by the sensor 140. The electronic communication between the climate controller 125 and the sensor 140 can enable the sensed climate control parameters to be utilized in a control of the CCU 115.

As discussed in more detail below, the transport climate control system 105 can include a vision system (e.g., the vision system 710 shown in FIG. 7) that includes one or more image capturing devices (e.g., the image capturing devices image capturing devices 425, 426, 435, 436, 715 shown in FIGS. 2-4 and 7) for capturing images within or outside of the van 100.

FIG. 1B depicts the climate controlled straight truck 150 that includes the climate controlled space 160 for carrying cargo and the transport climate control system 155. The transport climate control system 155 can include, among other components, a climate control circuit that connects, for example, a compressor, a condenser, an evaporator, and an expander (e.g., an expansion valve or other expansion devices) to provide climate control within the climate controlled space 160. In some embodiments, the climate control circuit can be a single stage climate control circuit or a cascade climate control circuit. The transport climate control system 155 is configured to provide climate control within the climate controlled space 160.

The transport climate control system 155 can include a CCU 133 that is mounted to a front wall 170 of the climate controlled space 160. The CCU 133 can include, for example, the compressor, the condenser, the evaporator, and the expander. In an embodiment, the CCU 133 can be a transport refrigeration unit.

The transport climate control system 155 also includes a programmable climate controller 175 and one or more climate control sensors that are configured to measure one or more parameters of the transport climate control system 155 (e.g., an ambient temperature outside of the truck 150, an ambient humidity outside of the truck 150, a compressor suction pressure, a compressor discharge pressure, a supply air temperature of air supplied by the CCU 133 into the climate controlled space 160, a return air temperature of air returned from the climate controlled space 160 back to the CCU 133, a humidity within the climate controlled space 160, etc.) and communicate climate control data to the climate controller 175. The one or more climate control sensors can be positioned at various locations outside the truck 150 and/or inside the truck 150 (including within the climate controlled space 160).

The climate controller 175 is configured to control operation of the transport climate control system 155 that may include a single integrated control unit 175 or may include a distributed network of climate controller elements 175, 180. The number of distributed control elements in a given network can depend upon the particular application of the principles described herein. The measured parameters obtained by the one or more climate control sensors can be used by the climate controller 175 to control operation of the transport climate control system 155.

The truck 150 includes a sensor 185. In the illustrated embodiment, the sensor 185 is represented as a single sensor. It will be appreciated that in other embodiments, the truck 150 includes a plurality of sensors 185. In some embodiments, the sensor 185 can monitor one or more climate control parameters (e.g., temperature, humidity, atmosphere, etc.) within the climate controlled space 160 or just outside the truck 150. The sensor 185 can be used by the climate controller 175 to control operation of the transport climate control system 155. The sensor 185 can be in electronic communication with a power source (not shown) of the CCU 133. In an embodiment, the sensor 185 can be in electronic communication with the climate controller 175.

It will be appreciated that the electronic communication between the sensor 185 and the climate controller 175 can enable network communication of the sensed climate control parameters measured by the sensor 185. The electronic communication between the climate controller 175 and the sensor 185 can enable the sensed climate control parameters to be utilized in a control of the CCU 133.

As discussed in more detail below, the transport climate control system 155 can include a vision system (e.g., the vision system 710 shown in FIG. 7) that includes one or more image capturing devices (e.g., the image capturing devices image capturing devices 425, 426, 435, 436, 715 shown in FIGS. 2-4 and 7) for capturing images within or outside of the truck 150.

FIG. 1C illustrates one embodiment of the climate controlled transport unit 200 attached to a tractor 205. The climate controlled transport unit 200 includes a transport climate control system 210 for a transport unit 215. The tractor 205 is attached to and is configured to tow the transport unit 215. The transport unit 215 shown in FIG. 1C is a trailer.

The transport climate control system 200 can include a climate control circuit that connects, for example, a compressor, a condenser, an evaporator, and an expander (e.g., an expansion valve or other expansion devices) to provide climate control within the climate controlled space 225. In some embodiments, the climate control circuit can be a single stage climate control circuit or a cascade climate control circuit.

The transport climate control system 210 includes a CCU 220. The CCU 220 is disposed on a front wall 230 of the transport unit 215. In other embodiments, it will be appreciated that the CCU 220 can be disposed, for example, on a rooftop or another wall of the transport unit 215. In an embodiment, the CCU 220 can be a transport refrigeration unit.

The transport climate control system 210 also includes a programmable climate controller 235 and one or more sensors (not shown) that are configured to measure one or more parameters of the transport climate control system 210 (e.g., an ambient temperature outside of the transport unit 215, an ambient humidity outside of the transport unit 215, a compressor suction pressure, a compressor discharge pressure, a supply air temperature of air supplied by the CCU 220 into the climate controlled space 225, a return air temperature of air returned from the climate controlled space 225 back to the CCU 220, a humidity within the climate controlled space 225, etc.) and communicate climate control data to the climate controller 235. The one or more climate control sensors can be positioned at various locations outside the transport unit 200 and/or inside the transport unit 200 (including within the climate controlled space 225).

The climate controller 235 is configured to control operation of the transport climate control system 210 including components of the climate control system 210. The climate controller 235 may include a single integrated control unit 240 or may include a distributed network of climate controller elements 240, 245. The number of distributed control elements in a given network can depend upon the particular application of the principles described herein. The measured parameters obtained by the one or more climate control sensors can be used by the climate controller 235 to control operation of the transport climate control system 210. The climate controlled transport unit 200 includes a sensor 250. In the illustrated embodiment, the sensor 250 is represented as a single sensor. It will be appreciated that in other embodiments, the climate controlled transport unit 200 can include a plurality of sensors 250. In some embodiments, the sensor 250 can monitor one or more climate control parameters (e.g., temperature, humidity, atmosphere, etc.) within the climate controlled space 225 or just outside the transport unit 200. The sensor 250 can be used by the climate controller 235 to control operation of the transport climate control system 210.

The sensor 250 can be in electronic communication with a power source (not shown) of the CCU 220. In an embodiment, the sensor 250 can be in electronic communication with the climate controller 235. It will be appreciated that the electronic communication between the sensor 250 and the climate controller 235 can enable network communication of the sensed climate control parameters measured by the sensor 250. The electronic communication between the climate controller 235 and the sensor 250 can enable the sensed climate control parameters to be utilized in a control of the CCU 220.

As discussed in more detail below, the transport climate control system 210 can include a vision system (e.g., the vision system 710 shown in FIG. 7) that includes one or more image capturing devices (e.g., the image capturing devices image capturing devices 425, 426, 435, 436, 715 shown in FIGS. 2-4 and 7) for capturing images within or outside of the transport unit 215.

FIG. 1D illustrates an embodiment of the climate controlled transport unit 275. The climate controlled transport unit 275 includes the multi-zone transport climate control system (MTCS) 280 for a transport unit 275 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, or other similar transport unit), etc.

The MTCS 280 includes a CCU 290 and a plurality of remote units 295 that provide environmental control (e.g. temperature, humidity, air quality, etc.) within a climate controlled space 300 of the transport unit 275. The MTCS 280 can include, a climate control circuit in thermal communication with the climate controlled space 300. The climate controlled space 300 can be divided into a plurality of zones 305. The term "zone" means a part of an area of the climate controlled space 300 separated by walls 310. The CCU 290 can operate as a host unit and provide climate control within a first zone 305a of the climate controlled space 300. The remote unit 295a can provide climate control within a second zone 305b of the climate controlled space 300. The remote unit 295b can provide climate control within a third zone 305c of the climate controlled space 300. Accordingly, the MTCS 280 can be used to separately and independently control environmental condition(s) within each of the multiple zones 305 of the climate controlled space 300.

The climate control circuit that connects, for example, a compressor, a condenser, an evaporator, and an expander (e.g., an expansion valve or other expansion devices) to provide climate control within the climate controlled space 300 of the MTCS 280. In some embodiments, the climate control circuit can be a single stage climate control circuit or a cascade climate control circuit.

The CCU 290 is disposed on a front wall 315 of the transport unit 275. In other embodiments, it will be appreciated that the CCU 290 can be disposed, for example, on a rooftop or another wall of the transport unit 275. The CCU 290 can include portions or all of the climate control circuit, for example, the compressor, the condenser, the evaporator, and the expander to provide conditioned air within the climate controlled space 300. The remote unit 295a is disposed on a ceiling 320 within the second zone 305b and the remote unit 295b is disposed on the ceiling 320 within the third zone 305c. Each of the remote units 295a, b includes an evaporator (not shown) that connects to the rest of the climate control circuit provided in the CCU 290. In an embodiment, the CCU 290 can be a transport refrigeration unit.

The MTCS 280 also includes a programmable climate controller 325 and one or more climate control sensors that are configured to measure one or more parameters of the MTCS 280 (e.g., an ambient temperature outside of the transport unit 275, an ambient humidity outside of the transport unit 275, a compressor suction pressure, a compressor discharge pressure, supply air temperatures of air supplied by the CCU 290 and the remote units 295 into each of the zones 305, return air temperatures of air returned from each of the zones 305 back to the respective CCU 290 or remote unit 295a or 295b, a humidity within each of the zones 305, etc.) and communicate climate control data to a climate controller 325. The one or more climate control sensors can be positioned at various locations outside the transport unit 275 and/or inside the transport unit 275 (including within the climate controlled space 300).

The climate controller 325 is configured to control operation of the MTCS 280 including components of the climate control circuit. The climate controller 325 may include a single integrated control unit 330 or may include a distributed network of climate controller elements 330, 335. The number of distributed control elements in a given network can depend upon the particular application of the principles described herein. The measured parameters obtained by the one or more climate control sensors can be used by the climate controller 325 to control operation of the MTCS 280.

The climate controlled transport unit 275 includes a sensor 340. In the illustrated embodiment, the sensor 340 is represented as a single sensor. It will be appreciated that in other embodiments, the climate controlled transport unit 275 can include a plurality of sensors 340. In some embodiments, the sensor 340 can monitor one or more climate control or operating parameters (e.g., temperature, humidity, atmosphere, airflow, and the like) within the climate controlled space 300. The sensor 340 can be used by the climate controller 325 to control operation of the MTCS 280.

The sensor 340 can be in electronic communication with a power source (not shown) of the CCU 290. In an embodiment, the sensor 340 can be in electronic communication with the climate controller 325. It will be appreciated that the electronic communication between the sensor 340 and the climate controller 325 can enable network communication of the sensed climate control parameters measured by the sensor 340. The electronic communication between the climate controller 325 and the sensor 340 can enable the sensed climate control parameters to be utilized in a control of the CCU 290.

As discussed in more detail below, the MTCS 280 can include a vision system (e.g., the vision system 710 shown in FIG. 7) that includes one or more image capturing devices (e.g., the image capturing devices image capturing devices 425, 426, 435, 436, 715 shown in FIGS. 2-4 and 7) for capturing images within or outside of the transport unit 275.

FIG. 1E depicts the intermodal container 350 having the transport climate control system 355 for providing climate control within a climate controlled space 358. The transport climate control system 355 includes a climate control unit (CCU) 360 that is mounted to a side 352 at one end of the container 350. In an embodiment, the CCU 360 can be a transport refrigeration unit.

The transport climate control system 355 can include, among other components, a climate control circuit in thermal communication with the climate controlled space 358. The climate control circuit that connects, for example, a compressor, a condenser, an evaporator, and an expander (e.g., an expansion valve or other expansion devices) to provide climate control within the climate controlled space 358. In some embodiments, the climate control circuit can be a single stage climate control circuit or a cascade climate control circuit. The transport climate control system 355 is configured to provide climate control within the climate controlled space 308.

The transport climate control system 355 also includes a programmable climate controller 370 and one or more climate control sensors that are configured to measure one or more parameters of the transport climate control system 355 (e.g., an ambient temperature outside of the intermodal container 350, an ambient humidity outside of the intermodal container 350, a compressor suction pressure, a compressor discharge pressure, a supply air temperature of air supplied by the CCU 360 into the climate controlled space 358, a return air temperature of air returned from the climate controlled space 358 back to the CCU 360, a humidity within the climate controlled space 358, etc.) and communicate the measured parameters to the climate controller 370. The one or more climate control sensors can be positioned at various locations outside the intermodal container 350 and/or inside the intermodal container 350 (including within the climate controlled space 358).

The climate controller 370 is configured to control operation of the transport climate control system 355. The climate controller 370 may include a single integrated control unit 372 or may include a distributed network of climate controller elements 372, 374. The number of distributed control elements in a given network can depend upon the particular application of the principles of this disclosure. The measured parameters obtained by the one or more climate control sensors can be used by the climate controller 370 to control operation of the transport climate control system 355.

The intermodal container 350 includes a sensor 375. In the illustrated embodiment, the sensor 375 is represented as a single sensor. It will be appreciated that in other embodiments, the intermodal container 350 can include a plurality of sensors 375. In some embodiments, the sensor 375 can monitor one or more climate control parameters (e.g., temperature, humidity, atmosphere, etc.) within the climate controlled space 358 or just outside the intermodal container 350. The sensor 375 can be used by the climate controller 370 to control operation of the transport climate control system 355. The sensor 375 can be in electronic communication with a power source (not shown) of the CCU 360. In an embodiment, the sensor 375 can be in electronic communication with the climate controller 370. It will be appreciated that the electronic communication between the sensor 375 and the climate controller 370 can enable network communication of the sensed climate control parameters measured by the sensor 375. The electronic communication between the climate controller 370 and the sensor 375 can enable the sensed climate control parameters to be utilized in a control of the CCU 360.

As discussed in more detail below, the transport climate control system 355 can include a vision system (e.g., the vision system 710 shown in FIG. 7) that includes one or more image capturing devices (e.g., the image capturing devices image capturing devices 425, 426, 435, 436, 715 shown in FIGS. 2-4 and 7) for capturing images within or outside of the intermodal container 350.

Figure 2:
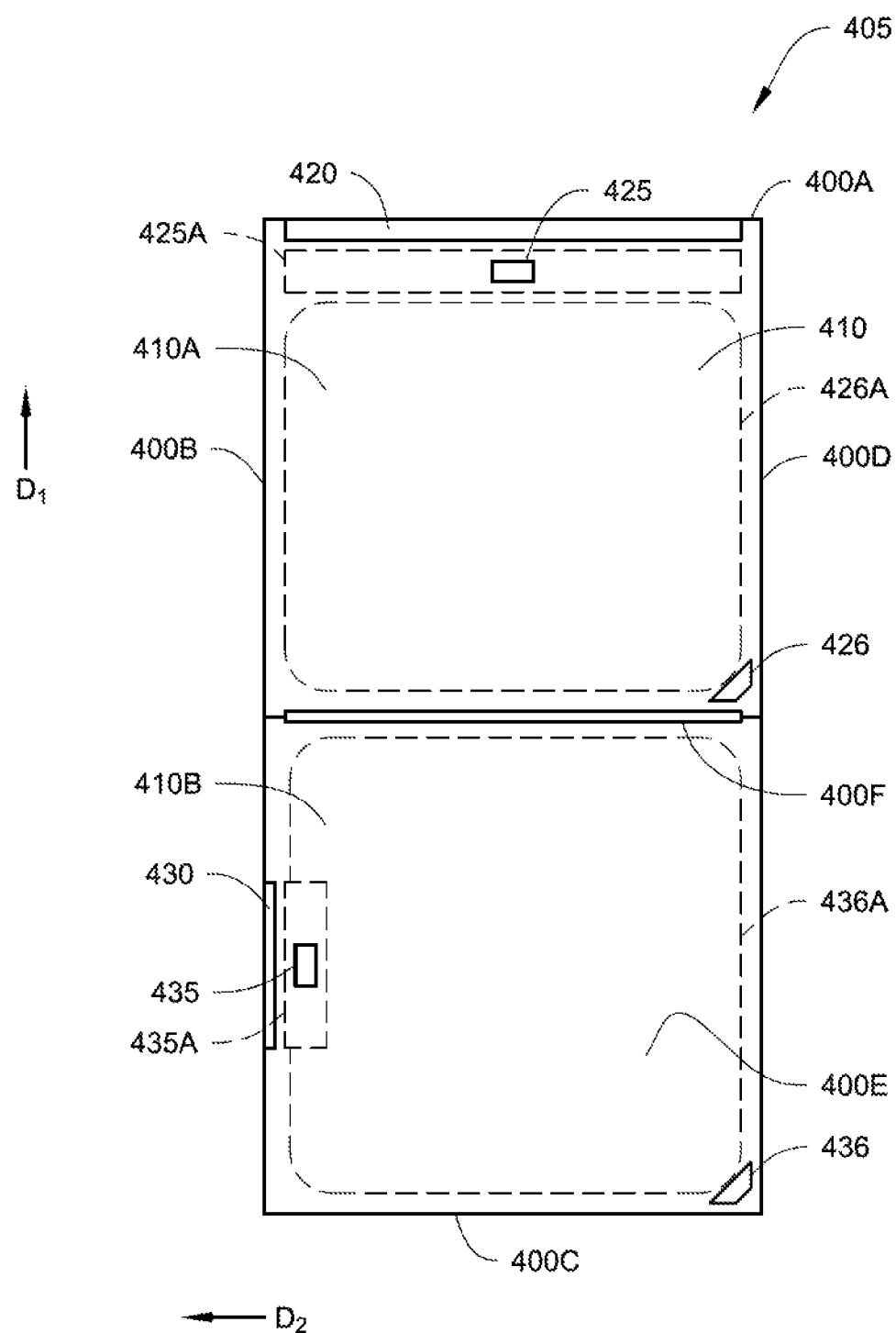
FIG. 2 is a top view from the interior of a transport unit, according to an embodiment.

FIG. 2 is a top view from the interior of a transport unit 400, according to an embodiment. For illustrative purposes, the top view omits a roof of the transport unit 400 to show the layout inside the transport unit 400 from above. A transport climate control system 405 can provide climate control within a climate controlled space 410 of the transport unit 400. The transport climate control system 405 can be, for example, the transport climate control system 105, 155, 210, 275, or 355 as shown and described in FIGS. 1A-E. The climate controlled space 410 can be, for example, the climate controlled space 110, 160, 225, 300, or 358 shown in FIGS. 1A-E.

The transport unit 400 includes a back wall 400A, a first side wall 400B, a front wall 400C, and a second side wall 400D, along with a floor 400E and a ceiling (not shown), enclosing the climate controlled space 410 and isolating the climate controlled space 410 from the ambient conditions outside the climate controlled space 410. In an embodiment, the walls 400A-D, the floor 400E, and the roof can provide structural integrity for the transport unit 400. In another embodiment, the walls 400A-D, the floor 400E, and the roof can provide a mounting surface for a climate control unit (CCU, not shown). For example, the walls 400A-D, the floor 400E, or the roof can be the rooftop 120 or the front wall 170, 230, or 315 shown in FIGS. 1A-1D.

A bulkhead 400F can be disposed in the transport unit 400 for dividing the climate controlled space 410 into a plurality of zones. The bulkhead 400F can be a divider installed vertically to the floor 400E separating the climate controlled space 410 into two or more zones. For example, the bulkhead 400F can be a physical barrier to restrict any unsecured items from moving from one zone to anther zone of the climate controlled space 410. For another example, the bulkhead 400F can separate the conditioned air in a first zone 410A from a second zone 410B where the climate control parameter(s) of the first zone 410A can be different from the climate control parameter(s) of the second zone 410B. In an embodiment, a climate control parameter can be referred to as an operation parameter.

In one embodiment, the bulkhead 400F can be, for example, the wall(s) 310 as shown and described in FIG. 1D. It is appreciated that the wall(s) 310 and the bulk head 400F are illustrated in FIGS. 1D and 2 to be vertically separating the climate controlled space into two or more zones. However, the wall(s) 310 and the bulk head 400F are not limited to a vertical orientation and can be installed in any orientation, shape, and/or contour to isolate a zone within the climate controlled space 410.

The transport unit 400 includes one or more openings for loading and unloading cargo into and out of the climate controlled space 410 or a zone 410A, 410B of the climate controlled space 410. A closing mechanism can be disposed over each of the one or more openings. The one or more openings can be disposed on one or more of the walls 400A-D, the floor 400E, the roof, a bulk head, a dividing wall and the like. The closing mechanism can be a swing door, a roll up door, a hatch, or the like, configured to be opened and closed over its corresponding opening(s). As illustrated in FIG. 2, the closing mechanisms can be a roll up door 420 disposed over an opening on the back wall 400A and a swing door 430 disposed over an opening on the side wall 400B.

The transport climate control system 405 includes multiple image capturing devices 425, 426, 435, 436 for collecting image data, such as photos or videos, of the climate controlled space 410. For example, the image capturing devices 425, 426, 435, 436 can be configured to capture image data within the climate controlled space 410, within a zone 410A, B within the climate controlled space 410, of a closing mechanism (e.g., 420, 430), and the like. In an embodiment, the image capturing devices 425, 426, 435, 436 can be configured to capture image data over a predetermined area outside the climate controlled space 410. While the transport climate control system 405 includes a plurality of image capturing devices 425, 426, 435, or 436, it will be appreciated that in other embodiments the number of image capturing devices can vary from a single image capturing device to any number of image capturing devices.

The image capture devices 425, 426, 435, 436 can be one or more cameras disposed onto or into a physical structure of the climate controlled space 410. The image capture devices 425, 426, 435, 436 can be configured to capture an image in visible light, the dark, infrared (e.g., thermal imaging camera), or the like. For example, an image capture device for capturing image data in visible light conditions can be configured to capture image data during daylight or with auxiliary lighting system illuminating the camera view. An image capture device for capturing image data in the dark can be, for example, a night vision camera that capture image data in little or no visible light. An image capture device for capturing an infrared image can be, for example, a thermal image camera that can capture temperature data on the surface of objects within the camera view. As illustrated in FIG. 2, each of the image capturing devices 425, 426, 435, 436 can be a camera. It is appreciated that the image capturing devices 425, 426, 435, 436 are not limited to cameras or recorders with a fixed rectangular view. For example, each of the image capturing devices 425, 426, 435, 436 can be a camera with a wide-angle-lens, a 360 camera, a camera mounted on a motorized base, and the like. It is further appreciated that two or more of the image capturing devices 425, 426, 435, or 436 can be combined into less camera(s) by covering the camera views of two or more camera using less camera(s), for example, by using a camera with a wider viewing angle. The image data captured by the image capturing devices 425, 426, 435, 436 can be transmitted to a vision system for analysis as discussed in more detail below.

The image capturing device 425 can be disposed on the roof of the climate controlled space 410. The image capturing device 425 can be configured to capture image data of a predetermined area within the climate controlled space 410 near the roll up door 420 so that any cargo loaded into or unloaded from the climate controlled space 410 through the roll up door 420 can be captured or recorded by the image capturing device 425 as image data.

In an embodiment, the image capturing device 425 for monitoring the roll up door 420 can also be disposed anywhere within or outside the climate controlled space 410 so long as the image capturing device 425 can capture the image data of cargos being loaded into and unloaded from the climate controlled space 410 via the roll up door 420. In another embodiment, the image capturing device 425 for the roll up door 420 can be mounted on the roof of the climate controlled space 110 adjacent to roll up door 420 with a camera view of at least a portion of the opening covered by the roll up door 420. The camera view of the image capturing device 425 can be larger than the opening covered by the roll up door 420 so that one or more visual aids can be captured within the view. A visual aid can improve detection or determination reliability and/or accuracy of a vision system. The visual aid(s) can be a marking or devices disposed on the wall nears the roll up door, a door frame, or a roll up door hardware (i.e. rails, tracks, switches, locking lever, etc.). In yet another embodiment, the image capturing device 425 is configured to capture an area 425A within the roll up door 420 where image data of cargos being loaded and unloaded through the roll up door 420 can be captured by the image capturing device 425.

In the illustrated embodiment, the image capturing device 426 can be disposed on or near the roof and the corner formed between the second side wall 400D and the bulk head 400F. The image capturing device 426 is configured to capture image data within an area 426A that occupies at least a portion of the climate controlled space 410 closer to the roll up door 420. Cargo can be stored within the area 426A. In an embodiment, the image capturing device 426 can be configured to capture image data of the opening covered by the roll up door 420.

In the illustrated embodiment, the image capturing device 435 can be mounted on or embedded within the roof of the climate controlled space. The image capturing device 435 can be configured to capture image data of a predetermined space within the climate controlled space 410 near the swing door 430 so that any cargo loaded into or unloaded from the climate controlled space 410 through the swing door 430 can be captured or recorded by the image capturing device 435 as image data. It is appreciated that the image capturing device 435 for monitoring the roll up door 430 can also be disposed anywhere within or outside the climate controlled space 410 so long as the image capturing device 435 can capture the image data of cargo being loaded into and unloaded from the climate controlled space 410 via the swing door 430.

In an embodiment, the camera image capturing device 435 for the swing door 430 is mounted on the roof of the climate controlled space 110 adjacent to the swing door 430 with a camera view of at least a portion of the opening covered by the swing door 430. The view of the image capturing device 435 can be larger than the opening covered by the swing door 430 so that one or more visual aids can be captured within the view. The one or more visual aids can be a marking or devices disposed on the wall nears the swing door 430, a door frame, or swing door hardware (i.e. opener, locking lever, etc.). In an embodiment, the image capturing device 435 is configured to capture an area 435A within the climate controlled space 410 near the swing door 430 where image data of cargo being loaded and unloaded through the swing door 430 can be captured by the image capturing device 435.

In the illustrated embodiment, the image capturing device 436 can be disposed on or near the roof and the corner formed between the second side wall 400D and the front wall 400C. The image capturing device 436 is configured to capture image data within an area 436A that occupies at least a portion of the climate controlled space 410 closer to the swing door 430. Cargo can be stored within the area 436A. It is appreciated that the image capturing device 436 can be configured to capture a larger or smaller area than the illustrated area 436A in FIG. 2. For example, the camera 436A can be configured to capture the areas 436A and 426A in an embodiment without the bulk head 400F.

It is appreciated that the areas 425A, 426A, 435A, and 436A captured by their respective image capturing devices 425, 426, 435, 436 can overlap with each other. Overlapping areas may provide image data that improves detection and determination accuracy. It is further appreciated the camera can be oriented to any direction that is suitable to capture useful image data. For example, one or more cameras can be oriented downwards toward the floor to capture image data of the top of the cargo, and one or more cameras can be oriented sideway to capture image data of the side of the cargo.

Figure 3:
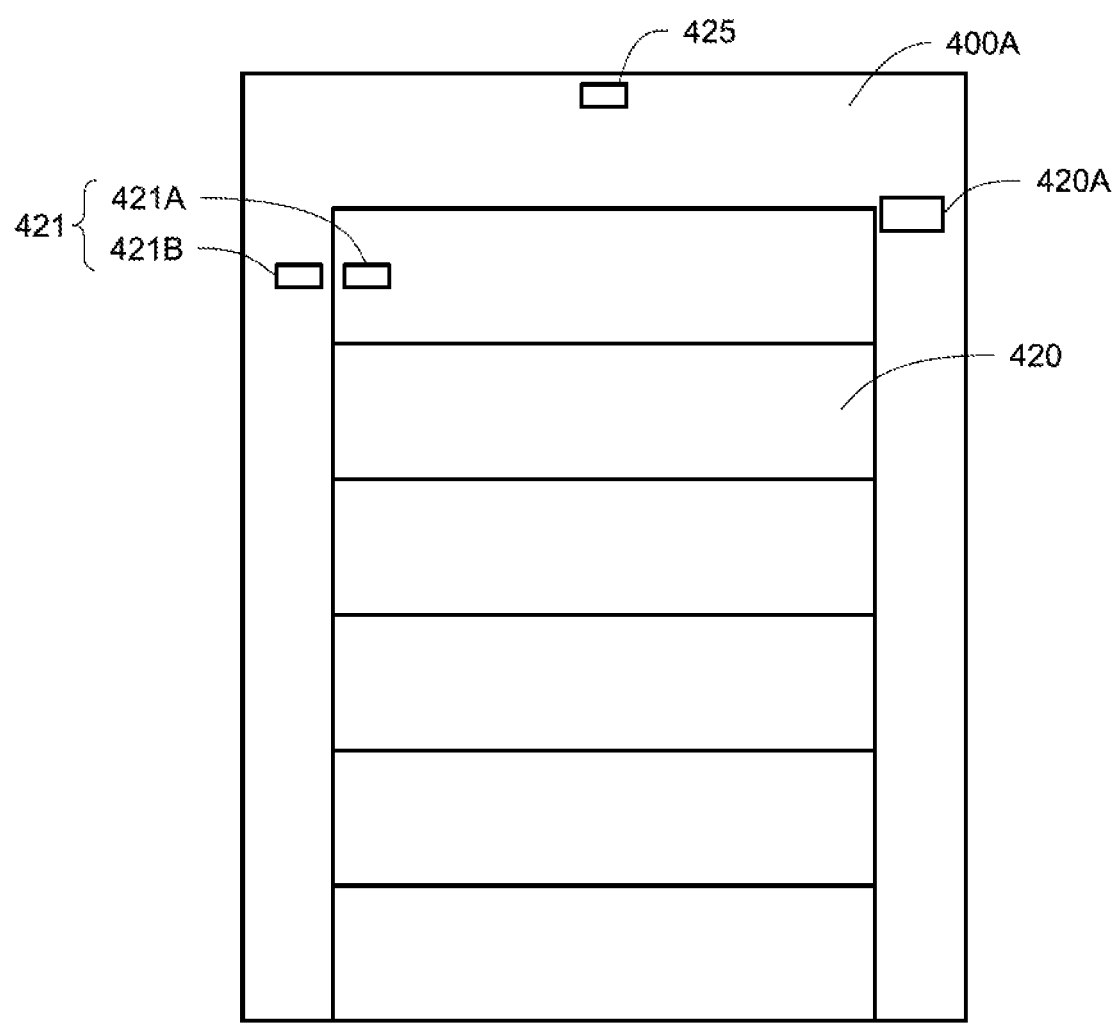
FIG. 3 is an interior view of a back wall from inside the transport unit shown in FIG. 2.

FIG. 3 is an interior view of the back wall 400A from inside the transport unit 400. The back wall 400A includes the roll up door 420 that can be opened in a vertical direction. In this embodiment, the image capturing device 425 is mounted over the roll up door 420 and on the roof (not shown) so as to view at least a portion of the opening covered by the roll up door 420. In another embodiment, the image capturing device 425 can capture the area 425A as shown and described with respect to FIG. 2. In another embodiment, the image capturing device 425 can be configured to capture a visual aid 421.

The visual aid 421 includes a first visual aid 421B disposed on the back wall 400A and a second visual aid 421A disposed on the roll up door 420 to improve detection or determination reliability and/or accuracy of a vision system that detects or determines whether the roll up door 420 is opened or closed based on the captured image data. The visual aid 421 can be a visually distinctive feature with shape, color, and/or illuminating property that is more accurately detectable by a vision system analyzing the captured image data from one or more of the image capturing devices 425, 426, 435, or 436 (shown in FIG. 2).

In an embodiment, the visual aid 421 can be an illuminating material installed onto the roll up door 420 and the back wall 400A. In some embodiments, the illuminating material can emit light by reflection, fluorescence, chemical reaction, or the like. In some other embodiments, the illuminating material can be one or more light bulbs (e.g., one or more LED light units) emitting light by converting electrical energy to light. The visual aid 421 can help indicate whether the door 420 has been closed or remains open. For example, the visual aid 421A can be a door mark and the visual aid 421B can be a wall mark disposed in horizontal alignment. When the roll up door 420 is opened or partially opened, the door mark 421A and the wall mark 421B are configured to misalign. The vision system can detect relative locations between the door mark 421A and the wall mark 421B and determine whether the two marks 421A, 421B are aligned or not. It is appreciated that the illustrated visual aid 421 consists of two marks 421A and 421B aligned with each other in the horizontal direction. However, the visual aid 421 can be in any form that indicates the roll up door 420 is closed or not. For example, the visual aid 421 can include two marks offset by a predetermined distance from each other, can include one mark to be compare to another visual feature or relative position within the field of view of a camera, and the like.

In some embodiments, the roll up door 420 can be powered by an actuator 420A disposed on the back wall 400A. The actuator 420 can include one or more connection parts and one or more power sources to open or close the roll up door 420. The connection parts can include, for example, one or more gears and chains configured to move the swing door 430 with the one or more power source. For example, the one or more power sources can be one or more motors. In some embodiments, the actuator 420A can be disposed above the roll up door 420 or on a side nears the top of the roll up door 420.

Figure 4:
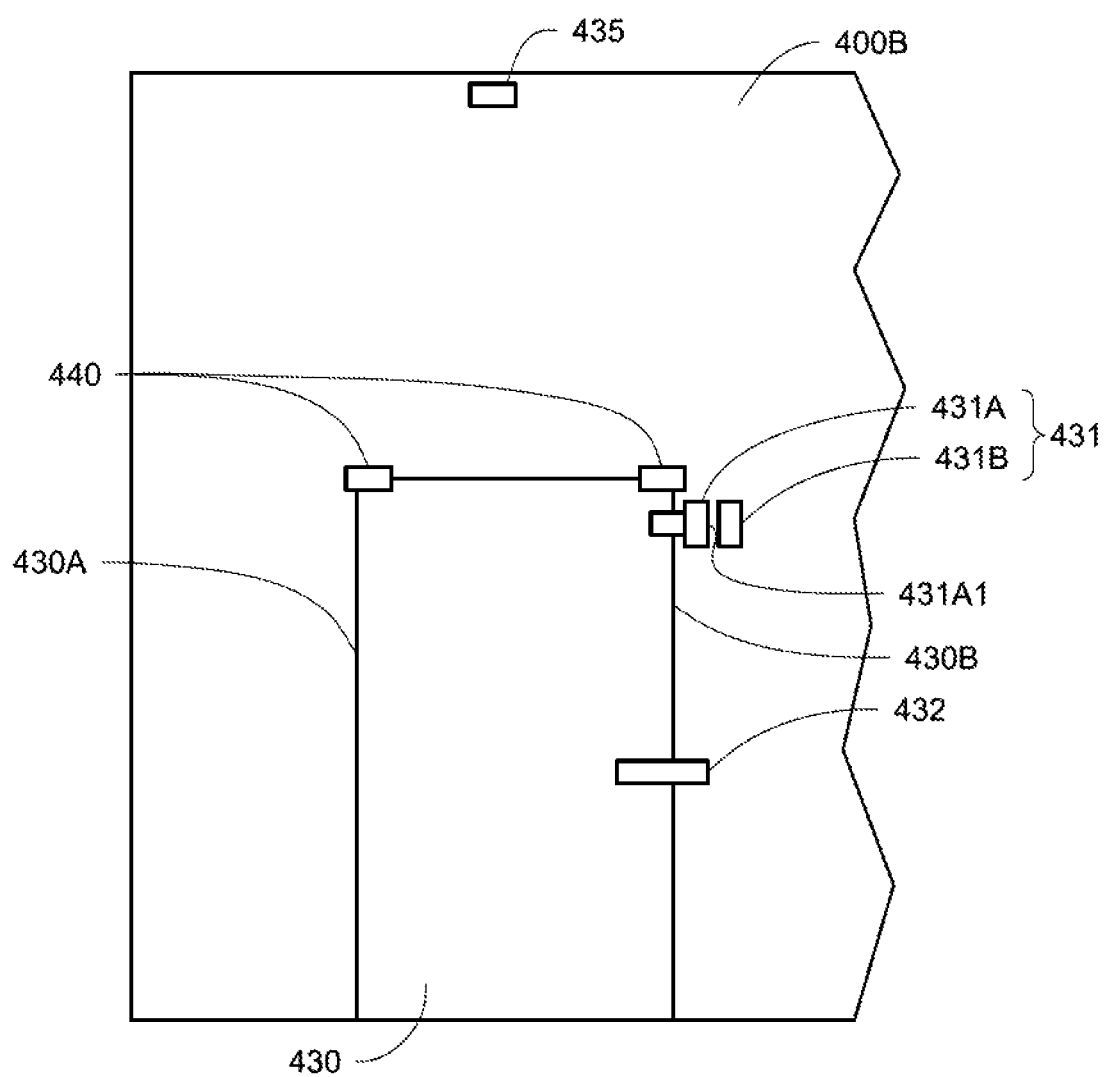
FIG. 4 is an interior view of a first side wall from inside the transport unit shown in FIG. 2.

FIG. 4 is an interior view of the first side wall 400B from inside the transport unit 400. The first side wall 400B includes the swing door 430 with a door handle 432 for opening and closing the swing door 430 by an operator. In this embodiment, the image capturing device 435 is mounted over the swing door 430 and on the roof (not shown) so as to view at least a portion of the opening covered by the swing door 430. In another embodiment, the image capturing device 435 can be configured to capture the area 435A as shown and described with respect to FIG. 2. In another embodiment, the image capturing device 435 can be configured to capture a visual aid 431.

In the embodiment shown in FIG. 4, the visual aid 431 is disposed on the first side wall 400B and/or the swing door 430 to improve detection or determination reliability and/or accuracy of a vision system that detects or determines whether the swing door 430 is opened, closed but unlatched, or closed and latched based on the captured image data. In some embodiments, the visual aid 431 can be a visually distinctive feature with shape, color, and/or illuminating property that is more accurately detectable by a vision system analyzing the captured image data from one or more of the image capturing devices 425, 426, 435, or 436 (shown in FIG. 2). In some other embodiments, the visual aid 431 can amplify a small feature, such as a small gap or protrusion, making them more reliably detectable by the vision system.

In an embodiment, the visual aid 431 can be a door flag installed onto the swing door 430 and the first side wall 400B. The visual aid 431 can help indicate whether the swing door 430 has been closed and/or latched.

In some instances, a small gap or an unlatched door may not be reliably observable by a vision system that looks for a gap between the door and the frame, for example, by detecting a light seepage through the gap. For example, an unlatched door or a closed door with a very small gap may not be reliably detectable from a captured image. Further, some doors with rubber gaskets, when closed but unlatched, may not create a gap that allows light seepage. This is because, when the door is closed but unlatched, the undepressed gasket may fill any gap between the door and the frame thereby creating no observable gap that can be reliably detected by a vision system. Accordingly, an unlatched door can be difficult to detect using a vision system.

In some embodiments, the visual aid 431 can improve detection accuracy by creating an amplified visual indicator for the vision system to capture and analyze. In some embodiments, the visual aid 431 can create the amplified visual indicator via a levering system that using a feature on the swing door 430 as a pivoting point or a mover in the levering system.

In the illustrated embodiment, the visual aid 431 includes a door flag 431A attached to the swing door 430 and a wall flag 431B attached to the first side wall 400B. The door flag 431A can be a block protruding and/or extending from the swing door 430 so that the image capturing device 435 can view the swing door 430 and the door flag 431A from above. When the swing door 430 is not fully closed or closed but unlatched, the swing door 430 can be slightly protruding from the wall 400B on an interior face 400B1 (indicated in FIG. 5) of the wall 400B. While the slight protruding may be difficult to be reliably detected in a captured image by a vision system, the door flag 431A and/or the wall flag 431B can create an amplified visual indicator for more reliable detection.

In some embodiments, the amplified visual indicator can be a gap between the door flag 431A and the first side wall 400B. A gap outside the door can be more reliably detectable, for example, because the gap can be unaffected by any potential door gaskets. In an embodiment, the door flag 431A can include an end 431A1 pointing away from the swinging edge 430B of the swing door 430. The door flag 431A attaches to the swing door 430 and extends beyond a swinging edge 430B of the swing door 430. The gap between the door flag 431A and the first side wall 400B is larger than any gap on the door because the end 431A1 of the door flag 431A is further away from the hinge edge 430A.

In some embodiments, the door flag 431A and the wall flag 431B can be disposed in alignment from the view of the image capturing device 435 when the swing door 430 is closed and/or latched. When the swing door 430 is not fully closed or unlatched, the door flag 431A is swung away from the first side wall 400B with the swing door 430 thereby creating a misalignment between the door flag 431A and the wall flag 431B. The image capturing device 435 can be configured to capture the misalignment from above. In some embodiments, the misalignment can be intermittent. For example, an intermittent misalignment can include detecting a door switching frequently between misalignment and correct alignment (e.g., a door being properly closed or latch). For example, switching frequently can be switching between detected misalignment and correct alignment over a predetermined number of times over a predetermined amount of time. For example, the predetermined number of times can be, but not limited to, 5, 10, 15, 20, times, or the like. For example, the predetermined amount of time can be, but not limited to, 1, 2, 3, 5 minutes, or the like. The image capturing device 435 can be configured to capture the intermittent misalignment.

In another embodiment, the swing door 430 can be painted or illuminated in a first color and the second side wall 400B can be painted or illuminated in a second color. The color detected by the image capturing device 435 or any other image capturing devices can be used to determine whether the swing door 430 is closed or not by determining whether a gap is detected between the two blocks of colors. The illumination of different colors can be achieved, for example, by colored LED lights.

It is appreciated that the door flag 431A is illustrated to be protruding beyond the edge of the door. However, the door flag 431A can be configured to be contained within the edge of the swing door 430 in the viewing direction of FIG. 4. It is further appreciated that the door flag 431A and the wall flag 431B can be one or more integrated or detachable components from the swing door 430 and the second side wall 400B, respectively.

In some embodiments, the swing door 430 can be powered by an actuator 440 disposed on the second side wall 400B. The actuator 440 can include one or more connection parts and one or more power sources to open or close the swing door 430. In some embodiments, the actuator 440 can be disposed on the hinge edge 430A side of the swing door, on the swinging edge 430B side, or both. above the roll up door 420 or on a side nears the top of the roll up door 420.

In some embodiments, curtains can be installed over a door way of the roll up door 420 (shown in FIG. 3) or the swing door 430. In some embodiments, the curtains can be known as strips or rear curtains. The curtains can be elongated vertical strips that are formed of a rubber material and configured to reduce convective air movement across the door way while the roll up door 420 or the swing door 430 are open. Thus, the curtains, when properly installed, can reduce the overall energy consumption of the climate control system. However, the curtains can be misused or damaged over time, decreasing their effectiveness in reducing energy consumption of the transport climate control system. For example, the curtains can be clipped to a side of the door frame or cut off, reducing its effectiveness in reducing convective air flow across the door way. In some embodiments, the curtains can be transparent or semitransparent, which can be difficult for vision system to detect and determine the presence of the curtains efficiently and accurately. For improving detection accuracy of the curtains, one or more visual aids can be disposed on the curtains. In some embodiments, the visual aid(s) can be a distinctive color and/or have a predetermined illuminating property. The visual aid(s) can be a painted strip, a sticker, or the like. In some embodiments, the visual aid(s) can be disposed on predetermined locations on the curtains, so that, when the curtains are properly draped over the door way, the visual aid(s) form one or more predetermined shapes or patterns. For example, the predetermined shape can be a square or a circular shape of a predetermined size that can be captured by, for example, the image capture device 425, 435. For example, a pattern can be a zig zag pattern across the curtains. The pattern can be alternative color or shapes disposed according to a predetermined order. Generally, the vision system can analyze a captured image to detect a predetermined geometric shape and/or pattern more accurately and efficiently than analyzing a captured image to detect a transparent or semitransparent feature. By disposing visual aid(s) on the curtains, a vision system can detect defective curtains more accurately, reducing energy consumption of transport climate control system.

Figure 5:
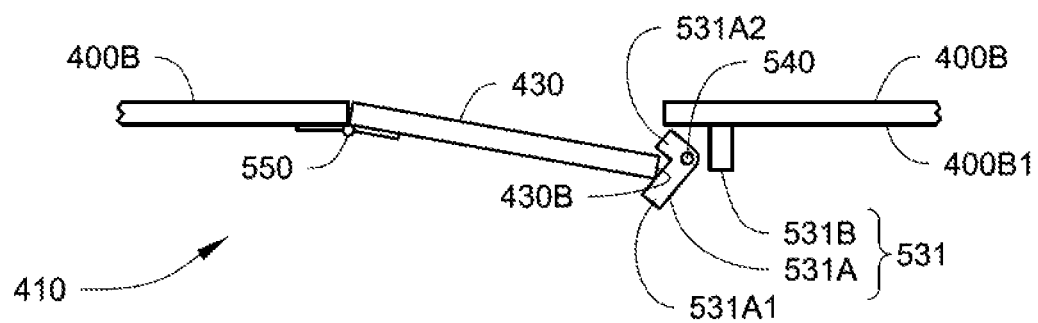
FIG. 5 is a view from an image capturing device disposed within transport unit shown in FIG. 2, according to an embodiment.

FIG. 5 is a view from the image capturing device 435, according to an embodiment. As shown in FIG. 5, the first side wall 400B includes the swing door 430 and a visual aid 531. The swing door 430 opens into the climate controlled space 410. The swing door 430 is configured to be opened and closed around a door hinge 550. The visual aid 531 includes a door flag 531A and a wall flag 531B. In one embodiment, the visual aid 531, the door flag 531A, and the wall flag 531B can be the visual aide 431, the door flag 431A, and the wall flag 431B as shown and described in FIG. 4.

In one embodiment, the door flag 531A is a levering system that includes a pivoting point 540 for allowing the door flag 531A to pivot around the pivoting point 540. The pivoting point 540 connects a long arm 531A1 and a short arm 531A2. The pivoting point 540 can be, for example, a mechanical hinge. When the swing door 430 is fully closed, the swing door 430 can pivot the door flag 531A into a predetermined pivotal position. The vision system can determine whether the swing door 430 is closed by analyzing an image captured by the image capturing device. The image can be of the door flag 531A being disposed at the predetermined pivotal position relative the field of view of the image capturing device 435 and/or to the wall flag 531B. When the swing door 430 is not fully closed or latched, the swinging edge 430B can act as a mover of the door flag 531A by pushing the long arm 531A1 and pivoting the door flag 531A away from the predetermined pivotal position. Accordingly, the swing door 430 can move the long arm 541A1 of the door flag 431A, creating an amplified visual indicator for the vision system to capture and analyze.

In yet another embodiment, one or more of the image capturing devices 425, 426, 435, or 436 can be configured to detect lighting contrast over a gap on the back wall 400A, or between the second side wall 400B and the swing door 430, which indicated the roll up door 420 or the swing door 430 is opened. For example, when the climate controlled space is lighted and the ambient is dark, a gap darker than the wall would indicate a door is opened. Further, when the climate controlled space is dark, a gap brighter than the wall would indicate a door is opened.

Figure 6:
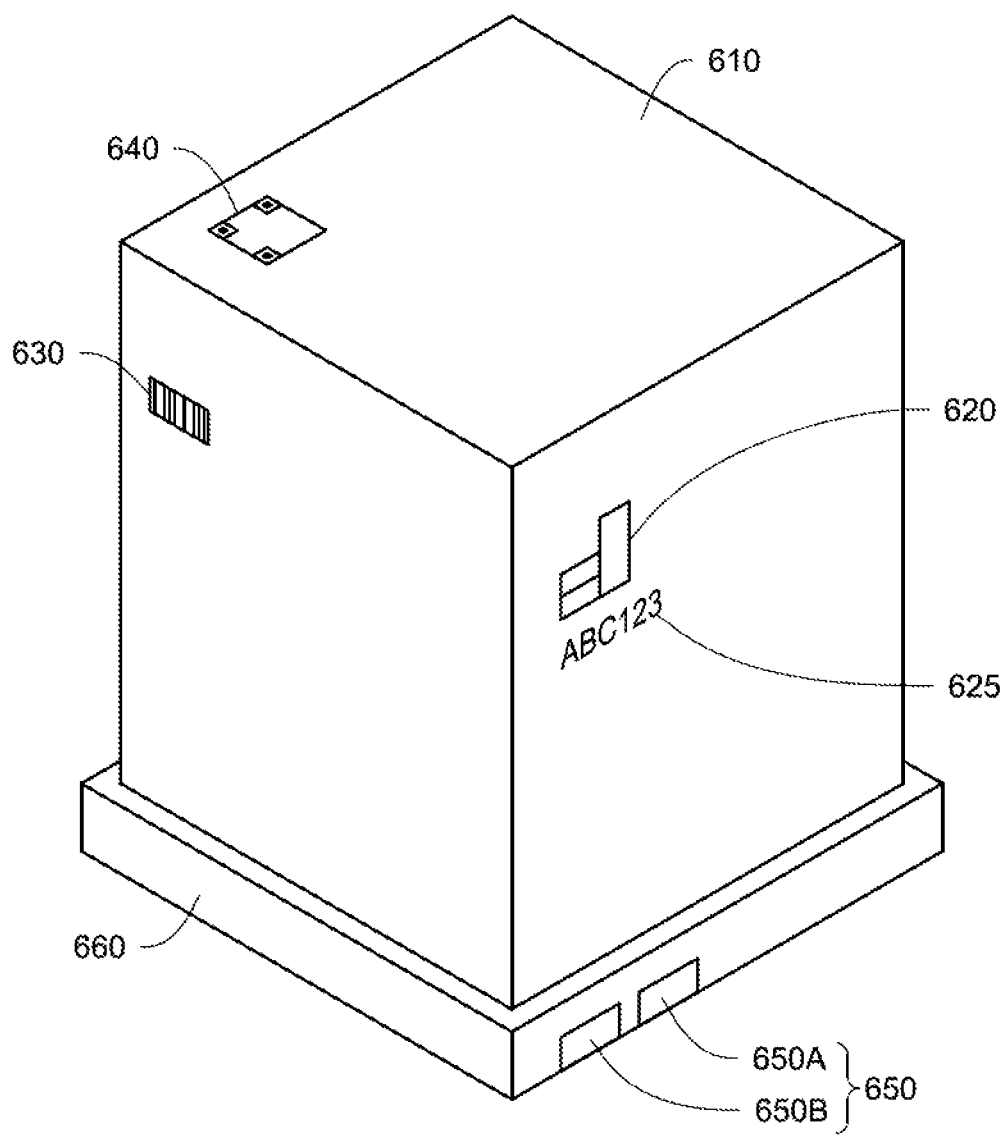
FIG. 6 is a perspective view of a cargo that can be stored in a climate controlled space of a transport unit, according to an embodiment.

FIG. 6 is a perspective view of a cargo 610, according to an embodiment. The cargo 610 can be loaded or unloaded into the climate controlled space 410 (shown in FIG. 2). For example, the cargo 610 can be any good or product(s) being transported in the transport climate unit 400. The cargo 610 can have different temperature, humidity, airflow, or other environmental condition requirements depending on the content of the cargo 610 or the requirements from the cargo owner. For example, a cargo 610 containing wheat or grain can require a predetermined range of temperature and humidity to be maintained in the climate controlled space 410 during transportation. In another example, a cargo 610 containing pharmaceuticals can require an ultra-low temperature of, for example, −80 degree Celsius or below in the climate controlled space 410 during transportation.

The cargo 610 can be a packaged product with one or more visual aids. The cargo 610 can be a box/crate or a stack of boxes/crates containing products. The visual aid can be a company logo 620, texts printed on a packaging 625, a barcode 630, a QR code 640, or other identifiable and differentiating features on the packaging. The visual aid can be printed directly on the cargo 610. In an embodiment, the visual aid logo 620, texts 625, barcode 630, QR code 640 or combination thereof can indicate the content of the cargo 610 or a key indexed to environmental condition requirements during transportation. For example, a vision system can analyze the captured image data can recognize a visual aid obtaining a key. A control system can use the key to determine the content of the cargo 610 by, for example, looking up the environmental condition requirements indexed to the obtained key. The environmental condition requirements requirement can include temperature requirement, humidity requirement, air flow requirements, timing requirement, and/or other information related to transportation of the cargo 610. In an embodiment, the library containing environmental condition requirements index to keys can be one or more database saved in a logistic planning and distribution system.

In an embodiment, the visual aid can be attached to the cargo 610. Attachable visual aids can be useful, for example, when wrapping is applied to the cargo 610 and anything printed or attached directly on the cargo 610 is no longer readily visible or robustly detectable by a vision system via captured image data. In another embodiment, the visual aid can be associated with an instruction to execute a program. For example, the visual aid associated with a timer can trigger an instruction of starting or ending a timer in the telematics system or on a user device. The timer can be useful for fleet management, record keeping for time sensitive cargo, and the like.

The cargo 610 can be disposed on a pallet 660 so that the cargo 610 can be efficiently moved by a forklift or a pallet jack. One or more visual aids 650 can be disposed on the pallet 660 for improving detection or determination reliability and accuracy of a vision system. The visual aid 650 can be one or more visually distinctive feature with shape, color, and/or illuminating property that is more accurately or efficiently detectable by a vision system analyzing the captured image data from one or more of the image capturing devices 425, 426, 435, or 436 (shown in FIG. 2). In an embodiment, the cargo 610 can be disposed in other containers such as a crate, a barrel, special designed moving container, and the like. The visual aid for the pallet 660 or other containers can be painted with color or combination of color blocks or strips to be detected more accurately by the vision system. In an embodiment, the visual aid(s) on the pallet 660 or other containers can provide a key correlated to transportation requirements of the cargo. In another the visual aid(s) on the pallet 660 or other containers, can be correlated to the pallet 660 or other containers themselves, for example, for returnable dunnage and promoting reuse and recycle of packaging or transportation related materials.

In the illustrated embodiment, the visual aid 650 includes a first portion 650A and a second portion 650B each with a color and/or shape. Different combination shapes and colors can be detected by the vision system and used with a key for looking up the content of the cargo 610, environmental conditions required for the cargo 610, securement requirement for the cargo 610, and/or other information related to transportation of the cargo 610.

It is appreciated that visual aid 650 can be disposed on any items related to the transport climate control system. For example, visual aid 650 can be disposed on a forklift, a pallet jack, a securement (i.e., a strap, anchor, or hooks), and the like.

FIG. 7 is a schematic diagram of a transport climate control system 705, according to an embodiment. The transport climate control system 705 includes a vision system 710, a controller 730, and a transport unit 750.

The vision system 710 is configured to capture and analyze image data captured by one or more image capturing devices, such as a camera, a recorder, or the like. As illustrated in FIG. 7, the vision system 710 include one or more image capturing devices 715. The image capturing device(s) 715 can be one or more of the image capturing devices 425, 426, 435, or 436 as shown and described in FIGS. 2-6.

An image recognition system 720 is configured to obtain image data from the one or more image capturing device(s) 715 includes a processor that is configured to recognize an item within the image data from the image capturing device(s) 715. The image recognition system 720 can detect a shape, color, text, visual aid(s), or other detectable features in the image data. In an embodiment, the visual aid can be the visual aid 421, 431, the logo 620, the texts 625, the barcode 630, the QR code 640. The image recognition system 720 can further determine movement of a detected object by, for example, comparing a detected item's relative locations in a captured photo or video over time.

In an embodiment, the image recognition system 720 can determine when a cargo is loaded in or unloaded from a transport unit by detecting a cargo or its visual aid(s) movement through an area captured by the one or more image capturing device(s) 715. For example, when the image recognition system 720 tracks a cargo moving through the area 425A in a direction D1 or the area 435A in a direction D2 of FIG. 2, the image recognition system 720 can determine that cargo is being unloaded from the climate controlled space 410. When the image recognition system 720 tracks a cargo moving through the area 425A along an opposite direction of the direction D1 or the area 435A along an opposite direction of the direction D2 of FIG. 2, the image recognition system 720 can determine that cargo is being loaded into the climate controlled space 410.

In an embodiment, at least one of the image capturing device(s) 715 can be a thermal camera. The image recognition system 720 can recognize a poor temperature spot within the climate controlled space 410. For example, a poor temperature spot can be an area in the climate controlled space 410, or on the cargo, having a temperature difference from the temperature in two adjacent areas on a thermal image captured by the image capture device 715. A poor temperature spot can indicate a leak in the climate control system 705 and/or cargo being stored improperly. In some embodiments, a poor temperature spot can be a change of temperature along a direction in the captured thermal image(s) over a predetermined threshold. The predetermined threshold can be a predetermined degree of temperature difference across a predetermined number of pixels in one or more predetermined directions in the captured thermal image(s). For example, a predetermined threshold can be a temperature change of ~3° C. in a linear direction across 10 pixels on thermal images(s), where 5 pixels can correspond, for example, to ~10 cm in the controlled space.

In another embodiment, the image recognition system 720 can detect a visual aid associated with a securement. By comparing a securement requirement for a detected item with the detected securement, the image recognition system 720 can detect an unsecured or under-secured item. The detection can be achieved by comparing the number or type of visual aid associated with a securement disposed on or near the item to the number or type required. For example, the item can be a cargo or equipment. The equipment can be a pallet jack.

It is appreciated that in some embodiments the image recognition system 720 can be processed locally onboard within the transport unit. For example, in some embodiments, the image recognition system 720 can be part of the controller 730. In other embodiments, the image recognition system 720 can be at least partially or wholly processed at a remote location or as a cloud service with the captured image data transmitted to the telematics system of the transport unit and further transmitted to the analyzing location or service. The analyzed image data can be returned to the telematics system or to other components of the transport climate control system or the transport unit. For example, other components can be the controller 730, a logistic planning and distribution system 740, the user device(s) 760, and the like.

The logistic planning and distribution system 740 can receive a key determined by the vision system 710 using captured image data. Information related to the key, such as the type of cargo, environmental condition requirement, securement requirement and the like, can be retrieved from an entry in a library indexed to the key. The library can be, for example, a bill of lading. The retrieved information can be transmitted to the controller 730 for providing instructions to the transport climate controlled circuit 750 or a notification message to a user device 760. In an embodiment, the instructions to the transport climate control circuit 750 can be the transport climate control circuit described for FIGS. 1A-E. In some embodiments, the instruction can include instruction to a controller of one or more transport unit devices and/or the transport climate controlled circuit. For example, the instruction can be configured to communicate with a controller of a powered door, an automated latch, a transport climate control circuit, a light, a camera, a vision system, a telematics system, a display, an alarms, or the like. It is appreciated that the controller of the one or more transport unit devices and/or the transport climate controlled circuit can be one or more dedicated controller (e.g., a door actuator controller, a compressor controller, or the like), an aggregated controller (e.g., a climate control system controller that operators one or more climate control devices, such as a compressor, a vent, a valve, and etc.; a telematics system that controls one or more sensors, on board computer, devices, and etc.; or the like), or a combination thereof.

In an embodiment, the loading and unloading detection, location information, and the detected cargo information can be provided to the logistic planning and distribution system 740. The system 740 can include a processor that is configured to verify whether the cargo is loaded into an appropriate zone of the climate controlled space 410 based on the requirement of the cargo and the cargo's owner. The system 740 can verify whether the cargo is unloaded at a correct location. The verification can be achieved by verifying the detected loading, unloading, and cargo information against the logistic planning and distribution system 740 that contains a predetermined loading, unloading, cargo information, and cargo environmental condition requirements. For example, a bill of lading can be included in the library and/or the logistic planning and distribution system 740.

In an embodiment, a location data can be provided to the logistic planning and distribution system. The location data can be determined from a GNSS or GPS module of a telematics system of the transport climate control system. The location data can be obtained from other inputs such as the vision system 710 detecting textual information in captured user data or user input via a user interface of a telematics system. In an embodiment, the location data can be a specific location or a geofence defining an area. The logistic planning and distribution system 740 can provide environmental condition requirement(s), loading or unloading location(s), and/or other transportation related information in a database indexed to a key. The key can be obtained from a recognized text, and/or visual aid obtained by the vision system, the location information provided by the telematics system, or a combination thereof.

It is appreciated that in some embodiments the logistic planning and distribution system 740 can be processed locally onboard within the transport unit. For example, in some embodiments, the logistic planning and distribution system 740 can be part of the controller 730. In other embodiments, the logistic planning and distribution system 740 can be at least partially or wholly processed at a remote location or as a cloud service.

The controller 730 receives the cargo related information from the image recognition system 710 and/or any additional cargo related information from the logics planning and distribution system 740. In an embodiment, the controller 730 can be the climate controller 125, 175, 235, 325, or 370 as shown and described in FIGS. 1A-E. The controller 730 can provide operation instruction(s) for the transport climate control circuit 750 according to the information received from the image recognition system 710 and/or the logics planning and distribution system 740. The operation instruction(s) can include transmitting a control signal to change one or more operation parameters of one or more devices in the climate control circuit 750. In an embodiment, the controller 730 can change an operating mode or operating parameter(s) of the climate control system 705.

In some embodiments, the operating modes can include a continuous cooling mode, a start/stop cooling mode, a heating mode, a fan only mode, a null mode, a pre-conditioning mode, a dry-out mode, and a defrost mode, etc. The transport climate control system can operate in a continuous cooling mode when, for example, the transport climate control system is attempting to cool the climate controlled space as quickly as possible (e.g., performing an initial pull down of the temperature in the climate controlled space to the desired temperature setpoint, after the transport unit has stopped to load or remove cargo from the climate controlled space, etc.). The transport climate control system can operate in a start/stop cooling mode when, for example, the temperature in the climate controlled space is attempting to maintain or slowly adjust the climate in the climate controlled space (e.g., the climate controlled space has reached or is close to reaching a desired temperature setpoint. The transport climate control system can operate in a heating mode when, for example, the transport climate control system is attempting to heat the climate controlled space to a desired temperature setpoint. The transport climate control system can operate in a fan only mode when, for example, the transport climate control system is attempting to provide air flow within the climate controlled space without heating or cooling the climate controlled space. The transport climate control system can operate in a null mode when, for example, the compressor is not operating and the fans may or may not be operating to provide airflow within the climate controlled space. The transport climate control system can operate in a defrost mode when, for example, the transport climate control system is attempting to defrost an evaporator coil of the climate control circuit. The transport climate control system can operate in a pre-conditioning mode when, for example, the transport climate control system is anticipating a cooling capacity change. The transport climate control system can operate in a dry-out mode when, for example, the transport climate control system is attempting to create airflow within the climate controlled space to remove, for example, liquid water, from the climate control space by running one or more fans or blowers with one or more doors or vents opened.

Operating parameters can be variable settings of climate control circuit equipment such as compressor, evaporator, expander, condenser, economizer, damper, drivetrain, generator, the like or environmental conditions such as temperature, pressure, relative humidity, airflow, and the like. Environmental conditions can be controlled by changing operating parameter(s) of the climate control system. In some embodiments, the operating instruction(s) can include adjusting heating or cooling capacities of the climate control circuit 750 by transmitting a control signal to a compressor for adjusting operation of the compressor. The controller can compare environmental condition set point(s) with sensor measured conditions and/or the environmental condition(s) required by the detected cargo to determine and adjust operating parameter set points of the climate control system.

In another embodiment, the operating instruction(s) can include an operational profile that includes a predetermined series of operating parameters or operating mode settings over time. The operational profile can be predetermined and particularly designed for a particular type of cargo or for more efficient control of climate control capacity for conserving energy. For example, bananas transported under an operational profile designed for bananas can extend the shelf life of the bananas. It is appreciated that the operating parameters or operating mode settings of the climate control system can be determined by a single type or a mix of cargo determined by the system.

In an embodiment, the operating instruction(s) can include transmitting an alert message to a user device 760. For example, an alert message can be a textual or pictorial message of an unclosed door, misaligned door and wall flags, intermittently misaligned door and wall flags, or the like detected by the vision system 710. The vision system 710 can transmit the textual or pictorial message to a user interface of a telematics system of a vehicle transporting the transport climate control system 705. For example, the vision system 710 can transmit the alert message for unclosed door detection when detecting misaligned or intermittent misaligned door and wall flags (e.g., 431A and 431B) to a display of the telematics system on the transport unit. The alert message can include a message alerting an operator to stop the transport unit and apply corrective actions. For another example, the alert message can be triggered by the visual system 710 detecting an intermittent misaligned door and wall flag (e.g., 431A and 431B) for alerting for a failed door latch by displaying a message for detecting failed door latches. The alert message can be displayed on a screen of the telematics system of the transport unit, a hand held device of an operator of the transport climate control system 705, and/or another device connected to the transport climate control system 705.

In yet another embodiment, the operating instruction(s) can include turning on or off the lights in the transport unit for providing better lighting for image capture, improving operation safety, conserving energy, and the like. For example, the operating instruction(s) can include triggering the light to turn on when a visual aid is detected as moving in the transport unit.

In some embodiments, the operating instruction(s) can include transmitting an instruction to a controller of a transport unit device. A transport unit device can be any devices disposed in the transport unit. For example, a transport unit device can be a powered door (e.g., powered by a door actuator), an automated latch, a light, a camera, a vision system, and the like. For example, when the rolled up door 420 or the swing door 430 is configured to be opened and closed by an actuator 420A or 430B, for example, an electrical door actuator. The actuator can be configured to be controlled by an actuator controller in communication with the vision system 710, for example, via the telematics system of the transport unit. The operating instruction can include transmitting a control signal to the actuator to opens or closes a door. In another embodiment, an automatic latch for a door can pull a partially closed door to a closing position for attaching the latch. The operating instruction can include transmitting a control signal to the automatic latch to pull the door closed and apply the automatic latch when a misalignment of door and wall flags (e.g., 431A and 431B) is detected by the vision system 710. In yet another embodiment, the operating instruction can include transmitting an instruction for preventing the transport unit being driven away, for example, by applying breaks or disengaging driving mechanisms of the vehicle moving the transport unit when the vision system 710 detects an unclosed or unlatch door.

The determined instruction can include an adjustment instruction, a recommendation instruction, a notification instruction, a transport unit instruction, or the like. In some embodiments, an adjustment instruction can include one or more control signals transmitted to a controller for the transport climate control system 705 for changing an operating mode and/or an operating parameter. In some embodiments, an adjustment instruction can include one or more control signals transmitted to a controller for the transport climate control system 705 for changing an operating mode, an operating parameter, or the like. In some embodiments, a recommendation instruction can include transmitting an alert by displaying a notification containing a recommendation determined by the vision system. For example, the recommendation can include a message suggesting moving cargo because of a mismatch determined by the vision system. In some embodiments, the notification instruction can include transmitting a visual, audio, or textual alert to the transport unit or a user device. In an embodiment, the notification instruction can include a recommendation instruction. In some embodiments, a transport unit instruction can include a control signal transmitted to a controller for the transport unit devices 770 associated with the vision system 710.

FIG. 8 is a flow chart of a method 800 for operating a transport climate control system (e.g., the transport climate control system 705 shown in FIG. 7), according to an embodiment. The method 800 can improve transport climate control system operation by adjusting a climate control circuit for meeting the environmental condition(s) required by the cargo, forecasting energy consumption, detecting leaking, capturing photos, detecting unclosed doors, etc. The method 800 can be achieved by analyzing photos, recordings, or other image data of the transport climate system, analyzing the image data to obtain cargo related information, and providing the obtained cargo information to a controller to operate the transport unit accordingly. The image recognition accuracy can be improved by visual aids such as a streamer, painted strips on a pallet, a bar code, a QR code, a sticker, a door flag, or the like. The method 800 can improve the operation by detecting cargo being loaded and unloaded into a wrong zone or location, alerting a door remained open, and adjusting climate control circuit to supply the appropriate capacity.

The method 800 includes an image capturing device capturing an image within a climate controlled space at 810; analyzing the captured image by an image recognition system communicatively connected with the image capturing device to obtain analyzed image data at 820; determining an instruction on the analyzed image data at 830; and a controller executing the determined instruction for the transport climate control system at 840.

At 810, an image capturing device captures an image within a climate controlled space. In an embodiment, the camera can be any of the image capturing devices 425, 426, 435, 436, 715 shown in FIGS. 2-4 and 7; the climate controlled space can be any of the climate controlled spaces 110, 160, 225, 300, 358, 410 shown in FIGS. 1A-E and 2; the controller can be any of the controllers 125, 175, 235, 325, 370, 730 shown in FIGS. 1A-E and 7; and the method 800 can be applicable to any of the transport climate control systems 105, 155, 210, 355, 405, 705 as shown and described, for example, in FIGS. 1A-2 and 7. The method 800 then proceeds to 820.

At 820, an image recognition system (e.g., the image recognition system 720 shown in FIG. 7) analyzes the captured image obtained at 810 to obtain analyzed image data. In some embodiments, the image recognition system can recognize and determine the content of a cargo by visual indications such as shape, color, texts on the cargo itself or any visual aid(s) disposed on the cargo. The image recognition system can provide the detected visual aid(s) to a logistic planning and distribution system (e.g., the logistic planning and distribution system 740 shown in FIG. 7) to retrieve transportation information associated with the detected visual aid(s). The transportation information can be environmental conditions required or requested for the cargo, the type of product, the brand, the weight, the volume, the shipping/receiving address, and/or other information useful for the transport climate control system to control the climate control circuit and/or providing instructive feedbacks to an operator or a fleet manager.

In an embodiment, 810 and 820 can be repeated for monitoring cargo movement within the climate controlled space and for providing image data over time. The method 800 then proceeds to 830.

At 830, an instruction can be determined based on the analyzed image data obtained at 820. The analyzed image data obtained at 820 can include cargo recognized by the vision system and/or an environmental condition requirement obtained from the logistic planning and distribution system according to the recognized cargo or visual aids by the vision system. Also, any missing products can be determined by comparing the detected product with a bill of lading from the logistic planning and distribution system and with location information from, for example, the telematics system. The determined instruction can include triggering an interlock preventing the transport unit from be driven away until any detected mismatch or other issues are resolved. The instruction can include instruction for transport climate control system and/or transport unit devices. The method 800 then proceeds to 840.

At 840, the instruction determined at 830 is executed. This can include: at 850 adjusting an operating mode or an operating parameter of the transport climate control system according to a cargo recognized from the analyzed image data or a logistic planning and distribution system; at 860 recommending repositioning of a cargo recognized from the analyzed image data within the climate controlled space; and/or at 870 transmitting a notification of a door being opened or closed, a mismatch, or an unsecured item. A mismatch can be a difference between a required environmental condition and a current environment condition around the cargo. The required environmental condition can be determined based on the type of cargo, for example, detected and determined by the vision system. The current environment condition around the cargo can be detected, for example, by environment condition sensors disposed within the climate controlled space. The unsecured items can be detected by the lack of a securement or visual aid(s) associated with a securement near or on a securable item, such as a pallet or a pallet jack. In some embodiments, the notification can include one or more pictorial or textual messages on a user interface and/or one or more operating instructions to automatically control one or more of the transport unit devices.

At 850, adjusting an operating mode or an operating parameter can be achieved by the controller 730 receiving cargo information and/or environmental condition requirement from the visual system 710 and/or the logistic planning and distribution system 740. Adjusting the operating mode can include, for example, switching from a heating mode to a continuous or start-stop cooling mode depending on a change in the ambient environment conditions and/or environmental changes within the climate controlled space. The operating mode adjustment can include, for example, the controller 730 switching from a heating mode to a cooling mode. Adjusting the operating parameter can include changing an operating parameter settings, for example, changing a setpoint temperature from a first setpoint to a second setpoint, for example, because of a change of cargo. The operating parameter adjustment can include, for example, the controller 730 changing a temperature set point by changing a power output on a heating system.

At 860, an instruction can be transmitted, for example, by the controller 730 to the user device 760. The instruction can be based on a mismatch between a required environmental condition and a current environment condition around the cargo. For example, for a multi-zone transport climate control system, such as the MTCS 280 as shown in FIG. 1D, a mismatch can be a cargo recognized from the captured image being loaded or unload to a wrong zone of the climate controlled space or at a wrong location. A wrong zone can be, for example, a cargo being required to be stored in the frozen zone of a MTCS but the cargo being detected by the image data in a room temperature zone of the MTCS. For example, a wrong location can be a cargo being required to be unloaded within a geofence but being detected as being unloaded outside the geofence. A recommendation instruction can be transmitted when a mismatch is determined by the vision system.

At 870, an alert or recommendation for addressing a determined mismatch can be transmitted as a notification through visual, audio, textual, and other communication devices. For example, the notification can be transmitted by an audible alert sound, synthetic or recorded message, buzzer, flashing light, light indicator, a text message shown in the UI displayed on a screen of the telematics system or a user device, and the like. In an embodiment, the notification can include an unsecured or under secured items. In yet another embodiment, the notification can include instructions for an operator or fleet manager to manually change an operating parameter or mode of the transport climate control system.

By controlling the climate within the climate controlled space using the vision system of the transport climate controls system and using visual aid(s) for improving the detection efficiency of the vision system, the performance of the transport climate control system can be improved. For example, the improved performance can include reduced energy consumption by detecting an opened or unlatched door. The performance of the transport climate control system can include adjusting one or more climate control conditions within the climate controlled space by matching environmental condition settings with the required environmental conditions according to the cargo housed within the climate controlled space. The improved performance can include added functionalities otherwise unreliable or non-feasible such as detecting unsecured equipment.

Aspects. It is noted that any one of aspects 1-15 can be combined with any one of aspects 16-31.

Aspect 1. A transport climate control system for improving climate control within a climate controlled space of a transport unit, the system comprising:
    a vision system having
    an image capturing device configured to capture an image within the climate controlled space, and
    an image recognition system communicatively connected with the image capturing device and configured to:
        analyze the captured image to obtain analyzed image data, and
        determine an instruction based on the analyzed image data for adjusting operation of the transport climate control system or the transport unit;
    the transport climate control system configured to provide climate control within the climate controlled space; and
    a controller configured to execute the determined instruction to adjust operation of the transport climate control system or the transport unit.

Aspect 2. The transport climate control system of aspect 1, wherein
    the image recognition system is configured to recognize a cargo, a door, a securement, an unsecured item, or equipment.

Aspect 3. The transport climate control system of any of one of aspects 1-2, wherein
    the determined instruction includes:
    adjusting an operating mode or an operating parameter of the transport climate control system according to a cargo recognized from the analyzed image data or a logistic planning and distribution system, recommending repositioning of a cargo recognized from the analyzed image data within the climate controlled space, or transmitting a notification for a door being opened or closed, a mismatch, or the unsecured item.

Aspect 4. The transport climate control system of any one of aspects 1-3, wherein the image recognition system is configured to analyze the captured image by recognizing a visual aid in the captured image.

Aspect 5. The transport climate control system of any one of aspects 1-4, wherein the mismatch includes the cargo recognized from the captured image being loaded or unload to a wrong zone of the climate controlled space or at a wrong location.

Aspect 6. The transport climate control system of aspect 5, wherein the wrong zone is determined by comparing the cargo against a bill of lading, and the wrong location is determined by a location information provided by a telematics system and a correct loading or unloading location provided by the logistic planning and distribution system communicatively connect to the transport climate control system.

Aspect 7. The transport climate control system of any one of aspects 4-6, wherein the visual aid includes at least one of a streamer, a painted strip on a pallet, a bar code, a QR code, a sticker, or a door indicator flag.

Aspect 8. The transport climate control system of any one of aspects 2-7, wherein the unsecured item is determined by the lack of a recognized securement.

Aspect 9. The transport climate control system of any one of aspects 2-8, wherein the controller is configured to set a timer according to the recognized cargo.

Aspect 10. The transport climate control system of any one of aspects 1-9, wherein the image capturing device is a thermal imaging camera configured to recognize a poor temperature spot.

Aspect 11. The transport climate control system of any one or aspects 1-10, wherein the image recognition system is configured to recognize a door being opened or unlatched by detecting a visual aid that provides an amplified visual indicator.

Aspect 12. The transport climate control system of any one of aspects 1-11, wherein the determined instruction includes an adjustment instruction to adjust an operating mode or an operating parameter of the transport climate control system according to a cargo recognized from the analyzed image data or a logistic planning and distribution system, Aspect 13. The transport climate control system of any one of aspects 1-12, wherein the determined instruction includes a recommendation instruction to recommend repositioning of a cargo recognized from the analyzed image data within the climate controlled space.

Aspect 14. The transport climate control system of any one of aspects 1-13, wherein the determined instruction includes a notification instruction to transmit a notification for a door being opened or closed, a mismatch, or an unsecured item.

Aspect 15. The transport climate control system of any one of aspects 1-14, wherein the determined instruction includes a transport unit instruction to operate a transport unit device.

Aspect 16. A method of providing controlling a transport climate control system that is providing climate control within a climate controlled space of a transport unit, the method comprising:

an image capturing device capturing an image within a climate controlled space;

analyzing the captured image by an image recognition system communicatively connected with the image capturing device to obtain analyzed image data;

determining an instruction based on the analyzed image data for adjusting operation of the transport climate control system or the transport unit; and a controller executing the determined instruction to adjust operation of the transport climate control system or the transport unit.

Aspect 17. The method of aspect 16, wherein analyzing the captured image includes recognizing a cargo, a door, a securement, an unsecured item, or equipment.

Aspect 18. The method of any one of the aspects 16-17, further comprises:

adjusting an operating mode or an operating parameter of the transport climate control system according to a cargo recognized from the analyzed image data or a logistic planning and distribution system, recommending repositioning of a cargo recognized from the analyzed image data within the climate controlled space, or transmitting a notification for a door being opened or closed, a mismatch, or the unsecured item.

Aspect 19. The method of any one of aspects 16-18, wherein analyzing the captured image includes recognizing a visual aid in the captured image.

Aspect 20. The method of any one of aspects 16-19, wherein the mismatch includes the cargo recognized from the captured image being loaded or unload to a wrong zone of the climate controlled space or at a wrong location.

Aspect 21. The method of aspect 20, wherein the wrong zone is determined by comparing the cargo against a bill of lading, and the wrong location is determined by a location information provided by a telematics system and a correct loading or unloading location provided by the logistic planning and distribution system communicatively connect to the transport climate control system.

Aspect 22. The method of any one of aspects 19-21, wherein the visual aid includes at least one of a streamer, painted strips on a pallet, a bar code, a QR code, a sticker, or a door indicator flag.

Aspect 23. The method of any one of aspects 17-22, wherein the unsecured item is determined by the lack of a recognized securement.

Aspect 24. The method of any one of aspects 17-23, further comprises:

setting a timer according to the cargo recognized from the captured image.

Aspect 25. The method of any one of aspects 16-24, further comprises:

recognizing a poor temperature spot using a thermal imaging camera.

Aspect 26. The method of any one of aspects 16-25, wherein analyzing the captured image includes recognizing a door being opened or unlatched by detecting a visual aid that provides an amplified visual indicator.

Aspect 27. The method of any one of aspects 16-26, further comprises
adjusting an operating mode or an operating parameter of the transport climate control system according to a cargo recognized from the analyzed image data or a logistic planning and distribution system.

Aspect 28. The method of any one of aspects 16-27, further comprises
recommending repositioning of a cargo recognized from the analyzed image data within the climate controlled space.

Aspect 29. The method of any one of aspects 16-28, further comprises
transmitting a notification for a door being opened or closed, a mismatch, or the unsecured item.

Aspect 30. The method of any one of aspects 16-29, wherein
analyzing the captured image includes recognizing a visual aid in the captured image.

Aspect 31. The method of one of aspects 16-30, wherein
the unsecured item is determined by the lack of a recognized securement in the captured image.

The terminology used in this Specification is intended to describe particular embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This Specification and the embodiments described are exemplary only, with the true scope and spirit of the disclosure being indicated by the claims that follow.

What is claimed is:

1. A transport climate control system for providing climate control within a climate controlled space of a transport unit, the system comprising:
   a vision system having
      an image capturing device configured to capture an image within the climate controlled space, and
      an image recognition system communicatively connected with the image capturing device and configured to:
         analyze the captured image to obtain analyzed image data, and
         determine an instruction based on the analyzed image data for adjusting operation of the transport climate control system or the transport unit;
   the transport climate control system configured to provide climate control within the climate controlled space; and
   a controller configured to execute the determined instruction to adjust operation of the transport climate control system or the transport unit.

2. The transport climate control system of claim 1, wherein
   the image recognition system is configured to recognize a door being opened or unlatched by detecting a visual aid that provides an amplified visual indicator.

3. The transport climate control system of claim 1, wherein
   the determined instruction includes an adjustment instruction to adjust an operating mode or an operating parameter of the transport climate control system according to a cargo recognized from the analyzed image data or a logistic planning and distribution system.

4. The transport climate control system of claim 1, wherein
   the determined instruction includes a recommendation instruction to recommend repositioning of a cargo recognized from the analyzed image data within the climate controlled space.

5. The transport climate control system of claim 1, wherein
   the determined instruction includes a notification instruction to transmit a notification for a door being opened or closed, a mismatch, or an unsecured item.

6. The transport climate control system of claim 1, wherein
   the mismatch includes the cargo recognized from the captured image being loaded or unload to a wrong zone of the climate controlled space or at a wrong location, wherein
   the wrong zone is determined by comparing the cargo against a bill of lading, and
   the wrong location is determined by a location information provided by a telematics system and a correct loading or unloading location provided by the logistic planning and distribution system communicatively connect to the transport climate control system.

7. The transport climate control system of claim 1, wherein
   the determined instruction includes a transport unit instruction to operate a transport unit device.

8. A method of controlling a transport unit with a transport climate control system that provides climate control within a climate controlled space of the transport unit, the method comprising:
   an image capturing device capturing an image within a climate controlled space;
   analyzing the captured image by an image recognition system communicatively connected with the image capturing device to obtain analyzed image data;
   determining an instruction based on the analyzed image data for adjusting operation of the transport climate control system or the transport unit; and
   a controller executing the determined instruction to adjust operation of the transport climate control system or the transport unit.

9. The method of claim 8, wherein
   analyzing the captured image includes recognizing a door being opened or unlatched by detecting a visual aid that provides an amplified visual indicator.

10. The method of claim 8, further comprises
   adjusting an operating mode or an operating parameter of the transport climate control system according to a cargo recognized from the analyzed image data or a logistic planning and distribution system.

11. The method of claim 8, further comprises
   recommending repositioning of a cargo recognized from the analyzed image data within the climate controlled space.

12. The method of claim 8, further comprises
   transmitting a notification for a door being opened or closed, a mismatch, or the unsecured item.

13. The method of claim 8, wherein
   analyzing the captured image includes recognizing a visual aid in the captured image.

14. The method of claim 8, wherein
the mismatch includes the cargo recognized from the captured image being loaded or unload to a wrong zone of the climate controlled space or at a wrong location, wherein
the wrong zone is determined by comparing the cargo against a bill of lading, and
the wrong location is determined by a location information provided by a telematics system and a correct loading or unloading location provided by the logistic planning and distribution system communicatively connect to the transport climate control system.

15. The method of claim 8, wherein
the unsecured item is determined by the lack of a recognized securement in the captured image.

\* \* \* \* \*